United States Patent
Kim

(10) Patent No.: US 12,126,857 B2
(45) Date of Patent: Oct. 22, 2024

(54) SIGNAL PROCESSING DEVICE AND VIDEO DISPLAY DEVICE COMPRISING SAME

(71) Applicant: LG ELECTRONICS INC., Seoul (KR)

(72) Inventor: Taewon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 17/922,245

(22) PCT Filed: Apr. 28, 2020

(86) PCT No.: PCT/KR2020/005576
§ 371 (c)(1),
(2) Date: Oct. 28, 2022

(87) PCT Pub. No.: WO2021/221189
PCT Pub. Date: Nov. 4, 2021

(65) Prior Publication Data
US 2023/0179828 A1    Jun. 8, 2023

(51) Int. Cl.
*H04N 21/438* (2011.01)
*H04L 27/01* (2006.01)
(Continued)

(52) U.S. Cl.
CPC ......... *H04N 21/4382* (2013.01); *H04L 27/01* (2013.01); *H04L 27/26* (2013.01);
(Continued)

(58) Field of Classification Search
CPC ....... H04N 21/41407; H04N 21/42676; H04N 21/4302; H04N 21/4382; H04N 21/4384; H04L 27/01; H04L 27/26
See application file for complete search history.

(56) References Cited

U.S. PATENT DOCUMENTS

| 5,029,014 A * | 7/1991 | Lindstrom | H04N 7/08 348/E7.024 |
| 5,600,366 A * | 2/1997 | Schulman | H04N 21/4622 348/E7.063 |

(Continued)

FOREIGN PATENT DOCUMENTS

| KR | 1020160108131 | 9/2016 |
| KR | 1020170012037 | 2/2017 |

(Continued)

OTHER PUBLICATIONS

PCT International Application No. PCT/KR2020/005576, International Search Report dated Jan. 20, 2021, 4 pages.

*Primary Examiner* — Michael B. Pierorazio
(74) *Attorney, Agent, or Firm* — LEE, HONG, DEGERMAN, KANG & WAIMEY

(57) ABSTRACT

The present disclosure relates to a signal processing device and an image display apparatus including the same. A signal processing device according to an embodiment of the present disclosure includes: a synchronizer configured to decode bootstrap data of first frame data in the received baseband signal; and an error corrector including a decoder configured to decode basic signaling data of the first frame data, and processing payload data of the first frame data is started within a first frame data period or a reception period of the first frame data. Accordingly, a data output time according to processing of frame data can be shortened.

17 Claims, 19 Drawing Sheets

(51) Int. Cl.
  *H04L 27/26* (2006.01)
  *H04N 21/414* (2011.01)
  *H04N 21/426* (2011.01)
  *H04N 21/43* (2011.01)

(52) U.S. Cl.
  CPC . *H04N 21/41407* (2013.01); *H04N 21/42676* (2013.01); *H04N 21/4302* (2013.01)

(56) References Cited

U.S. PATENT DOCUMENTS

| | | | | |
|---|---|---|---|---|
| 5,619,274 A | * | 4/1997 | Roop | H04N 21/435 348/E5.103 |
| 5,659,350 A | * | 8/1997 | Hendricks | H04N 21/482 725/116 |
| 5,774,170 A | * | 6/1998 | Hite | H04N 7/0887 725/35 |
| 5,805,974 A | * | 9/1998 | Hite | H04N 21/812 725/71 |
| 5,835,487 A | * | 11/1998 | Campanella | H04H 20/74 370/320 |
| 5,886,995 A | * | 3/1999 | Arsenault | H04N 21/2385 348/E7.063 |
| 5,889,950 A | * | 3/1999 | Kuzma | H04N 21/4622 348/E7.063 |
| 5,920,702 A | * | 7/1999 | Bleidt | H04N 21/658 710/30 |
| 5,978,649 A | * | 11/1999 | Kahn | H04N 7/165 348/E7.063 |
| 6,002,393 A | * | 12/1999 | Hite | H04N 21/812 348/E7.063 |
| 6,029,045 A | * | 2/2000 | Picco | H04N 21/25891 348/E7.063 |
| 6,035,038 A | * | 3/2000 | Campinos | H04N 7/163 340/5.74 |
| 6,035,397 A | * | 3/2000 | Campinos | H04N 21/2347 348/E7.056 |
| 6,105,060 A | * | 8/2000 | Rothblatt | H04B 7/18584 709/219 |
| 6,141,530 A | * | 10/2000 | Rabowsky | H04N 7/17345 348/436.1 |
| 6,157,719 A | * | 12/2000 | Wasilewski | H04N 7/1675 725/31 |
| 6,160,989 A | * | 12/2000 | Hendricks | H04N 21/42204 348/E5.103 |
| 6,330,719 B1 | * | 12/2001 | Zigmond | H04N 21/4782 348/E7.071 |
| 6,473,137 B1 | * | 10/2002 | Godwin | H04N 21/4384 348/731 |
| 6,546,556 B1 | * | 4/2003 | Kataoka | H04N 7/165 725/35 |
| 6,799,326 B2 | * | 9/2004 | Boylan, III | H04N 21/478 725/138 |
| 11,158,229 B2 | * | 10/2021 | Lim | G09G 3/20 |
| 11,463,135 B2 | * | 10/2022 | Murakami | H04W 84/12 |
| 2001/0003846 A1 | * | 6/2001 | Rowe | H04N 21/435 348/E7.063 |
| 2001/0004733 A1 | * | 6/2001 | Eldering | G06Q 30/0268 725/35 |
| 2001/0014970 A1 | * | 8/2001 | Kamperman | H04N 21/47211 725/31 |
| 2002/0003884 A1 | * | 1/2002 | Sprunk | H04N 21/835 375/E7.009 |
| 2002/0035730 A1 | * | 3/2002 | Ollikainen | H04L 12/1836 725/116 |
| 2002/0035731 A1 | * | 3/2002 | Plotnick | H04N 21/234336 348/E7.063 |
| 2002/0056102 A1 | * | 5/2002 | Dillon | H04N 21/47214 386/E5.001 |
| 2002/0107940 A1 | * | 8/2002 | Brassil | H04N 21/23424 709/219 |
| 2002/0144260 A1 | * | 10/2002 | Devara | H04N 21/23608 725/136 |
| 2002/0166120 A1 | * | 11/2002 | Boylan, III | H04N 21/4312 725/35 |
| 2003/0070169 A1 | * | 4/2003 | Beyers, II | H04N 7/17318 348/E7.071 |
| 2003/0110499 A1 | * | 6/2003 | Knudson | G06Q 30/0251 348/E7.071 |
| 2003/0126594 A1 | * | 7/2003 | Tsuria | H04N 21/44016 348/E7.063 |
| 2008/0137848 A1 | * | 6/2008 | Kocher | G11B 20/00231 380/201 |
| 2013/0051476 A1 | * | 2/2013 | Morris | H04N 19/137 375/E7.026 |
| 2017/0026152 A1 | * | 1/2017 | Atungsiri | H04L 1/0041 |
| 2017/0373918 A1 | * | 12/2017 | Kwak | H04N 21/858 |
| 2018/0287759 A1 | * | 10/2018 | Kundargi | H04W 56/0035 |
| 2020/0022100 A1 | * | 1/2020 | Simon | H04L 7/0037 |
| 2020/0045560 A1 | * | 2/2020 | Vermani | H04W 72/046 |
| 2020/0127808 A1 | * | 4/2020 | Takahashi | H04N 21/4302 |
| 2020/0296576 A1 | * | 9/2020 | Ouchi | H04L 5/001 |
| 2021/0012118 A1 | * | 1/2021 | Bohacik | H04N 23/66 |
| 2021/0028917 A1 | * | 1/2021 | Park | H04W 72/23 |
| 2021/0241668 A1 | * | 8/2021 | Lim | G09G 3/20 |

FOREIGN PATENT DOCUMENTS

| | | |
|---|---|---|
| KR | 1020190103919 | 9/2019 |
| KR | 1020190122842 | 10/2019 |

* cited by examiner

| Syntax | No. of Bits | Format |
|---|---|---|
| L1_Basic_signaling() { | | |
|    L1B_version | 3 | uimsbf |
|    L1B_mimo_scattered_pilot_encoding | 1 | uimsbf |
|    L1B_lls_flag | 1 | uimsbf |
|    L1B_time_info_flag | 2 | uimsbf |
|    L1B_return_channel_flag | 1 | uimsbf |
|    L1B_papr_reduction | 2 | uimsbf |
|    L1B_frame_length_mode | 1 | uimsbf |
|    if ( L1B_frame_length_mode=0 ) { | | |
|       L1B_frame_length | 10 | uimsbf |
|       L1B_excess_samples_per_symbol | 13 | uimsbf |
|    } else { | | |
|       L1B_time_offset | 16 | uimsbf |
|       L1B_additional_samples | 7 | uimsbf |
|    } | | |
|    L1B_num_subframes | 8 | uimsbf |
|    L1B_preamble_num_symbols | 3 | uimsbf |
|    L1B_preamble_reduced_carriers | 3 | uimsbf |
|    L1B_L1_Detail_content_tag | 2 | uimsbf |
|    L1B_L1_Detail_size_bytes | 13 | uimsbf |
|    L1B_L1_Detail_fec_type | 3 | uimsbf |
|    L1B_L1_Detail_additional_parity_mode | 2 | uimsbf |
|    L1B_L1_Detail_total_cells | 19 | uimsbf |
|    L1B_first_sub_mimo | 1 | uimsbf |
|    L1B_first_sub_miso | 2 | uimsbf |
|    L1B_first_sub_fft_size | 2 | uimsbf |
|    L1B_first_sub_reduced_carriers | 3 | uimsbf |
|    L1B_first_sub_guard_interval | 4 | uimsbf |
|    L1B_first_sub_num_ofdm_symbols | 11 | uimsbf |
|    L1B_first_sub_scattered_pilot_pattern | 5 | uimsbf |
|    L1B_first_sub_scattered_pilot_boost | 3 | uimsbf |
|    L1B_first_sub_sbs_first | 1 | uimsbf |
|    L1B_first_sub_sbs_last | 1 | uimsbf |
|    L1B_reserved | 48 | uimsbf |
|    L1B_crc | 32 | uimsbf |
| } | | |

FIG. 10D

| Cred_coeff | Number of Carriers (NoC) | | |
|---|---|---|---|
| | 8K FFT | 16K FFT | 32K FFT |
| 0 | 6913 | 13825 | 27649 |
| 1 | 6817 | 13633 | 27265 |
| 2 | 6721 | 13441 | 26881 |
| 3 | 6625 | 13249 | 26497 |
| 4 | 6529 | 13057 | 26113 |

SIGNAL PROCESSING DEVICE AND VIDEO DISPLAY DEVICE COMPRISING SAME

CROSS-REFERENCE TO RELATED APPLICATIONS

This application is the National Stage filing under 35 U.S.C. 371 of International Application No. PCT/KR2020/005576, filed on Apr. 28, 2020, the contents of which are all incorporated by reference herein in their entirety.

BACKGROUND OF THE PRESENT DISCLOSURE

1. Field of the Present Disclosure

The present disclosure relates to a signal processing device and an image display apparatus including the same, and more particularly, to a signal processing device and an image display apparatus including the same, which can shorten a data output time according to processing of frame data.

2. Description of the Related Art

A signal processing device is a device for receiving and processing a terrestrial digital broadcasting signal and a mobile communication signal.

The signal processing device receives an RF signal, including noise from a communication channel, via an antenna, and performs signal processing on the received RF signal.

For example, while processing the signal in the signal processing device, the RF signal is converted into a baseband signal.

Meanwhile, when the received baseband signal is an ATSC based signal, basic signaling data is decoded only by completing decoding of bootstrap data.

However, according to such a processing scheme, during a first frame data period or a reception period of a first frame data, payload data of the first frame cannot be processed, and during a reception period of second frame data, processing the payload data of the first frame is started.

SUMMARY OF THE PRESENT DISCLOSURE

It is an object of the present disclosure is to provide a signal processing device and an image display apparatus including the same, which can shorten a data output time according to processing of frame data.

In accordance with an aspect of the present disclosure, the above objects can be accomplished by providing a signal processing device and an image display apparatus including the same, including: a synchronizer configured to decode bootstrap data of first frame data in the received baseband signal; and an error corrector including a decoder configured to decode basic signaling data of the first frame data, and processing payload data of the first frame data is started within a first frame data period or a reception period of the first frame data.

Meanwhile, the signal processing device and the image display apparatus including the same in accordance with an aspect of the present disclosure may further include an equalizer configured to reconfigure a preamble of a first frame and a first sub frame based on the basic signaling data of the first frame data decoded by a decoder.

Meanwhile, the equalizer may include a frame reconfigurator configured to reconfigure the preamble of the first frame and the first sub frame based on the basic signaling data of the first frame data decoded by the decoder.

Meanwhile, the decoder may transmit the decoded basic signaling data of the frame data to the synchronizer and the frame reconfigurer in the equalizer.

Meanwhile, upon power on or changing a channel of an RF signal, processing the payload data of the first frame data may be started within the first frame data period or the reception period of the first frame data.

Meanwhile, in response to the decoder decoding the basic signaling data of the first frame data, the synchronizer and the equalizer may operate to output signals, respectively.

Meanwhile, a decoding completion time of the basic signaling data of the first frame data may be after an input completion time of first subframe data of the first frame data input into the synchronizer and before an input completion time of second subframe data of the first frame data.

Meanwhile, the decoding completion time of the basic signaling data of the first frame data may be after an output completion time of first preamble data of the first frame data output by the synchronizer, and before an output completion time of second preamble data of the first frame data output by the synchronizer or before an output completion time of the first subframe data of the first frame data output by the synchronizer.

Meanwhile, the decoded basic signaling data of the first frame data may include number information of preambles of the first frame and reduced carrier mode information of the first subframe.

Meanwhile, the decoder may decode detailed signaling data of the first frame data after completing the decoding of the basic signaling data of the first frame data.

Meanwhile, a decoding completion time of the detail signaling data of the first frame data may be after an input completion time of third subframe data of the first frame data input into the synchronizer and before an input completion time of fourth subframe data of the first frame data.

Meanwhile, a decoding completion time of the detail signaling data of the first frame data may be before an output completion time of the second subframe data of the first frame data output by the synchronizer.

Meanwhile, the synchronizer may output maximum carrier number information to the equalizer.

Meanwhile, the equalizer may operate from a time delayed further than a start time of the maximum number information of received carriers by an offset period after decoding the basic signaling data of the first frame data.

Meanwhile, the offset period may be set based on Fourier transform output and guard band removal in the synchronizer.

Meanwhile, a signal processing device and an image display apparatus including the same in accordance with another of the present disclosure include: a synchronizer configured to decode bootstrap data of first frame data in a received basedband signal; and an error corrector including a decoder configured to decode basic signaling data of the first frame data, and a decoding completion time of the basic signaling data of the first frame data is after an input completion time of first subframe data of the first frame data input into the synchronizer and before an input completion time of second subframe data of the first frame data.

Effects of the Disclosure

A signal processing device and an image display apparatus including the same according to an embodiment of the present disclosure include: a synchronizer configured to decode bootstrap data of first frame data in a received baseband signal, and an error corrector including a decoder configured to decode basic signaling data of the first frame data, and processing of payload data of the first frame data is started within a first frame data period or a reception period of the first frame data. Accordingly, a data output time according to processing of frame data can be shortened. In particular, the payload data of the first frame data can be processed within the first frame data period or the reception period of the first frame data.

Meanwhile, the signal processing device and the image display apparatus including the same according to an embodiment of the present disclosure may further include an equalizer configured to reconfigure a preamble of a first frame and a first sub frame based on the basic signaling data of the first frame data decoded by a decoder. Accordingly, the data output time according to the processing of the frame data can be shortened.

Meanwhile, the equalizer may include a frame reconfigurer reconfiguring the preamble of the first frame and the first sub frame based on the basic signaling data of the first frame data decoded by the decoder. Accordingly, the data output time according to the processing of the frame data can be shortened.

Meanwhile, the decoder may transmit the decoded basic signaling data of the frame data to the synchronizer and the frame reconfigurer in the equalizer. Accordingly, the data output time according to the processing of the frame data can be shortened.

Meanwhile, upon power on or changing a channel of an RF signal, processing the payload data of the first frame data may be started within the first frame data period or the reception period of the first frame data. Accordingly, the data output time according to the processing of the frame data can be shortened.

Meanwhile, in response to the decoder decoding the basic signaling data of the first frame data, the synchronizer and the equalizer may operate to output signals, respectively. Accordingly, the data output time according to the processing of the frame data can be shortened.

Meanwhile, it is preferable that a decoding completion time of the basic signaling data of the first frame data is after an input completion time of first subframe data of the first frame data input into the synchronizer and before an input completion time of second subframe data of the first frame data. Accordingly, the data output time according to the processing of the frame data can be shortened.

Meanwhile, the decoding completion time of the basic signaling data of the first frame data may be after an output completion time of first preamble data of the first frame data output by the synchronizer, and before an output completion time of second preamble data of the first frame data output by the synchronizer or before an output completion time of the first subframe data of the first frame data output by the synchronizer. Accordingly, the data output time according to the processing of the frame data can be shortened.

Meanwhile, the decoded basic signaling data of the first frame data may include number information of preambles of the first frame and reduced carrier mode information of the first subframe. Accordingly, the data output time according to the processing of the frame data can be shortened.

Meanwhile, the decoder can decode detailed signaling data of the first frame data after completing the decoding of the basic signaling data of the first frame data. Accordingly, the data output time according to the processing of the frame data can be shortened.

Meanwhile, it is preferable that a decoding completion time of the detail signaling data of the first frame data is after an input completion time of third subframe data of the first frame data input into the synchronizer and before an input completion time of fourth subframe data of the first frame data. Accordingly, the data output time according to the processing of the frame data can be shortened.

Meanwhile, it is preferable that a decoding completion time of the detail signaling data of the first frame data is before an output completion time of the second subframe data of the first frame data output by the synchronizer. Accordingly, the data output time according to the processing of the frame data can be shortened.

Meanwhile, the equalizer may operate from a time delayed further than a start time of the maximum number information of received carriers by an offset period after decoding the basic signaling data of the first frame data. Accordingly, the data output time according to the processing of the frame data can be shortened.

Meanwhile, the offset period is set based on Fourier transform output and guard band removal in the synchronizer. Accordingly, the data output time according to the processing of the frame data can be shortened.

Meanwhile, a signal processing device and an image display apparatus including the same according to another embodiment of the present disclosure include: a synchronizer configured to decode bootstrap data of first frame data in a received basedband signal; and an error corrector including a decoder configured to decode basic signaling data of the first frame data, and a decoding completion time of the basic signaling data of the first frame data is after an input completion time of first subframe data of the first frame data input into the synchronizer and before an input completion time of second subframe data of the first frame data. Accordingly, the data output time according to the processing of the frame data can be shortened.

DETAILED DESCRIPTION OF THE PREFERRED EMBODIMENTS

Hereinafter, embodiments of the present disclosure will be described in further detail with reference to the accompanying drawings.

In the following description, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
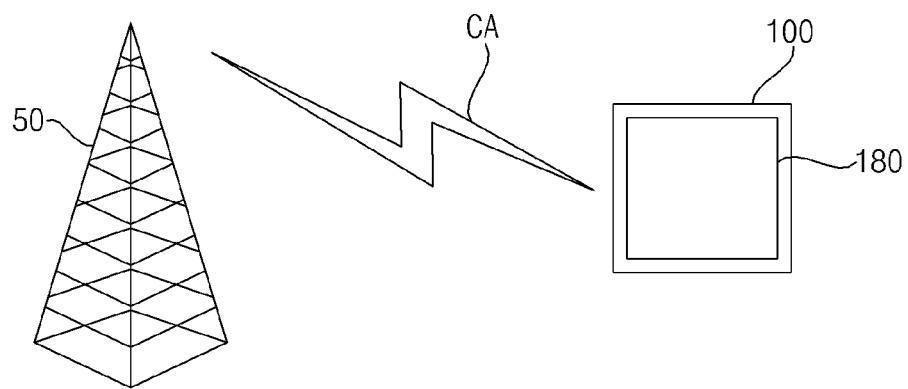
FIG. 1 is a diagram illustrating a radio frequency (RF) signal receiving system according to an embodiment of the present disclosure.

FIG. 1 is a diagram illustrating a radio frequency (RF) signal receiving system according to an embodiment of the present disclosure.

Referring to FIG. 1, an RF signal receiving system 10 according to an embodiment of the present disclosure may include a wireless signal transmitting device 10 for transmitting an RF signal CA, and a wireless reception device 80 for receiving the RF signal CA.

The wireless reception device 80 according to an embodiment of the present disclosure may be an RF receiving device for improving channel estimation accuracy in response to various communication channels or broadcast channel environments.

To this end, an RF receiving device 80 (referring to FIG. 7A) according to an embodiment of the present disclosure includes: a synchronizer 521b decoding bootstrap data of first frame data in a received baseband signal, and an error corrector 524b including a signaling decoder 913 decoding basic signaling data of the first frame data, and processing of payload data of the first frame data is started within a first frame data period or a reception period Pra of the first frame data. Accordingly, a data output time according to processing of frame data can be shortened. In particular, the payload data of the first frame data can be processed within the first frame data period or the reception period Pra of the first frame data.

Meanwhile, the RF receiving device 80 (referring to FIG. 7A) according to another embodiment of the present disclosure includes: a synchronizer 521b decoding bootstrap data of first frame data within a received baseband signal, and an error corrector 524b including a signaling decoder 913 decoding basic signaling data of the first frame data, and a decoding completion time Teb of the basic signaling data of the first frame data is after an input completion time Tm1 of first subframe data D_0 of the first frame data input into the synchronizer 521b and before an input completion time Tm2 of second subframe data D_1 of the first frame data. Accordingly, the data output time according to the processing of the frame data can be shortened.

Meanwhile, the RF signal CA of FIG. 1 may be a digital broadcasting signal, and in this case, the RF receiving device 80 of FIG. 1 may be included in an image display device 100 (refer to FIG. 2A) such as a TV or a mobile terminal 100b (refer to FIG. 2B) such as a cellular phone or a tablet terminal.

Meanwhile, the RF signal CA may be a broadcasting signal based on the ATSC 3.0 standard.

Figure 2A:
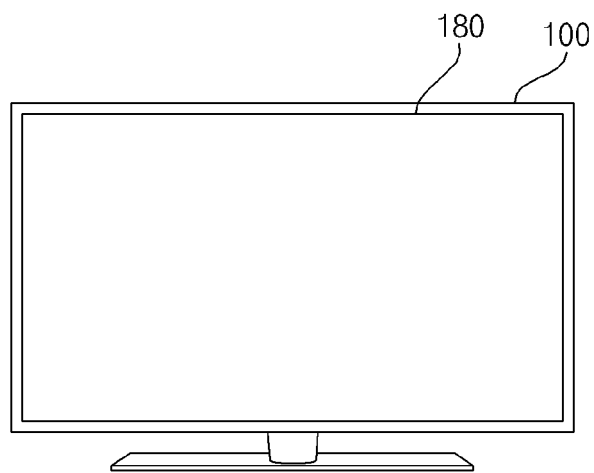
FIG. 2A is a diagram showing an example of an image display apparatus according to an embodiment of the present disclosure.

FIG. 2A is a diagram showing an example of an image display apparatus according to an embodiment of the present disclosure.

Referring to FIG. 2A, the image display apparatus 100 of FIG. 2A may include a display 180 and may also include the RF receiving device 80 described with reference to FIG. 1.

The image display apparatus 100 of FIG. 2A may include a signal processing device that performs Fourier transform based on a received baseband signal, extracts a pilot signal after performing Fourier transform, calculates a channel transfer function value of the extracted pilot signal, and selectively performs time interpolation based on the calculated channel transfer function value.

Accordingly, the data output time according to the processing of the frame data can be shortened. In particular, data may be stably ensured even in a mobile channel environment. In addition, the channel estimation accuracy is improved.

The image display apparatus 100 of FIG. 2A may include a signal processing device that removes a guard band based on a received baseband signal, extracts a pilot signal after removing the guard band, calculates a channel transfer function value of the extracted pilot signal, and selectively performs time interpolation based on the calculated channel transfer function value.

Accordingly, the data output time according to the processing of the frame data can be shortened. In particular, the data may be stably ensured even in the mobile channel environment. In addition, the channel estimation accuracy is improved.

Figure 2B:
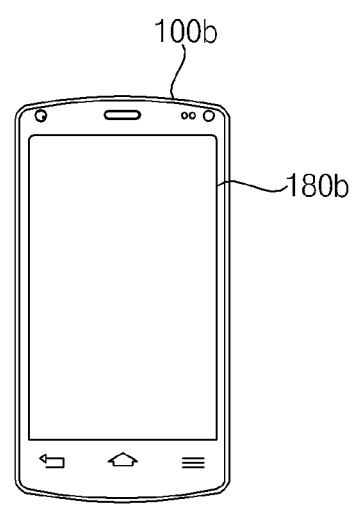
FIG. 2B is a diagram showing another example of an image display apparatus according to an embodiment of the present disclosure.

FIG. 2B is a diagram showing another example of an image display apparatus according to an embodiment of the present disclosure.

Referring to FIG. 2B, the mobile terminal 100b of FIG. 2B may include a display 180b and may also include the RF receiving device 80 described in FIG. 1.

The mobile terminal 100b of FIG. 2B may include a signal processing device that performs Fourier transform based on a received baseband signal, extracts a pilot signal after performing Fourier transform, calculates a channel transfer function value of the extracted pilot signal, and selectively performs time interpolation based on the calculated channel transfer function value.

Accordingly, the data output time according to the processing of the frame data can be shortened. In particular, the data may be stably ensured even in the mobile channel environment. In addition, the channel estimation accuracy is improved.

Meanwhile, the mobile terminal 100b of FIG. 2B may include a signal processing device that removes a guard band based on a received baseband signal, extracts a pilot signal after removing the guard band, calculates a channel transfer function value of the extracted pilot signal, and selectively performs time interpolation based on the calculated channel transfer function value.

Accordingly, the data output time according to the processing of the frame data can be shortened. In particular, the data may be stably ensured even in the mobile channel environment. In addition, the channel estimation accuracy is improved.

Figure 3:
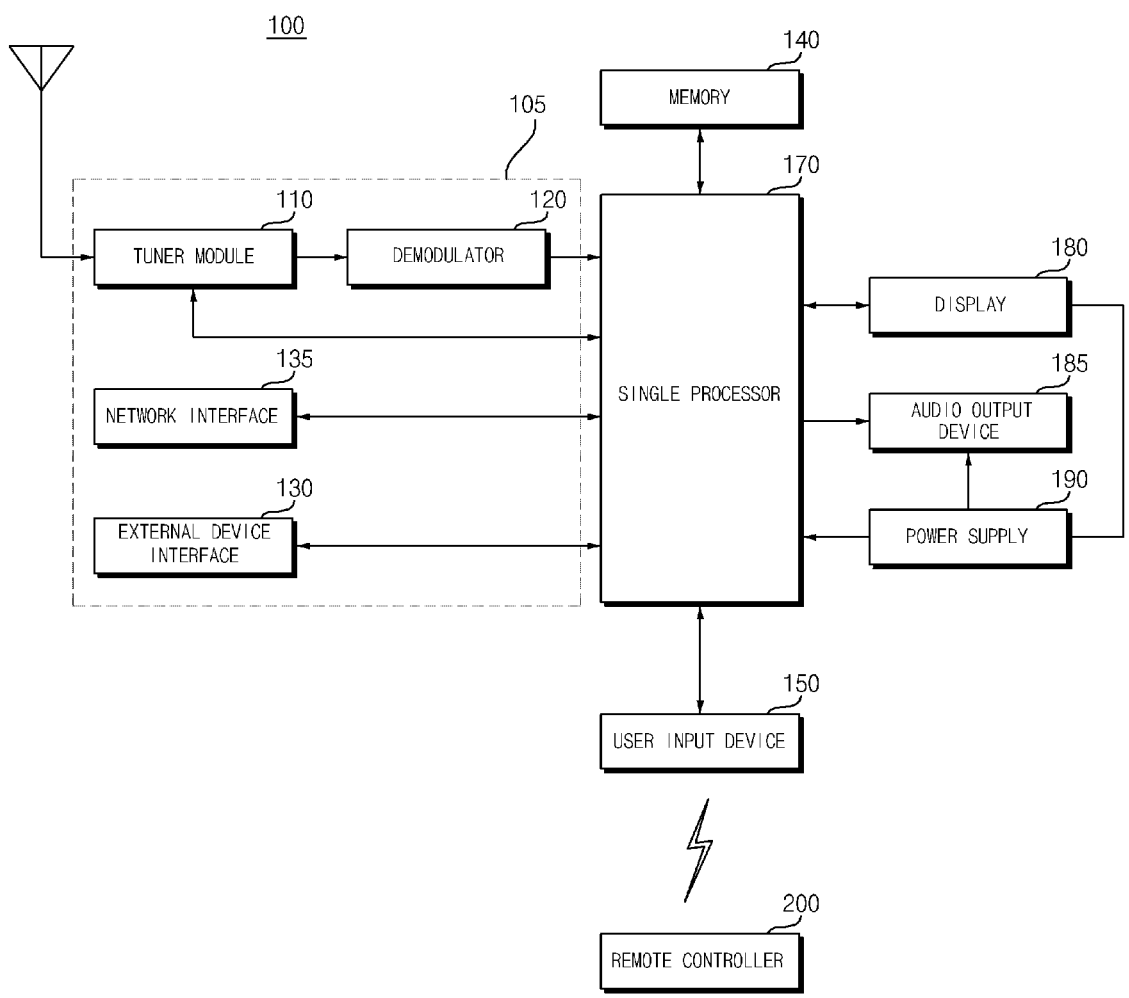
FIG. 3 is an internal block diagram of the image display apparatus of FIG. 2A.

FIG. 3 is an internal block diagram of the image display apparatus of FIG. 2A.

Referring to FIG. 3, the image display apparatus 100 according to an embodiment of the present disclosure includes a broadcast receiver 105, an external device interface 130, a memory 140, a user input interface 150, a sensor device (not shown), a signal processor, the display 180, and an audio output device 185.

The broadcast receiver 105 includes a tuner module 110, a demodulator 120, a network interface 135, and an external device interface 130.

Unlike the embodiment of FIG. 3, the demodulator 120 may be included in the tuner module 110.

Further, unlike the embodiment of FIG. 3, the broadcast receiver 105 may include only the tuner module 110, the demodulator 120, and the external interface 135, i.e., without including the network interface 135.

The tuner module 110 may tune a Radio Frequency (RF) broadcast signal corresponding to a channel selected by a user or all the previously stored channels, among RF broadcast signals received via an antenna (not shown). In addition, the tuner module 110 may convert the tuned RF broadcast signal into an intermediate frequency signal or a baseband signal (baseband image signal or baseband audio signal).

For example, if the selected RF broadcast signal is a digital broadcast signal, the tuner module 110 converts the digital broadcast signal into a digital IF signal (DIF), and if the selected RF broadcast signal is an analog broadcast signal, the tuner module 110 converts the analog broadcast signal into a baseband image or an audio signal (CVBS/SIF). That is, the tuner module 110 may process the digital broadcast signal or the analog broadcast signal. The analog baseband image or the audio signal (CVBS/SIF), which is output from the tuner module 110, may be directly input to the signal processor.

The tuner module 110 may include a plurality of tuners to receive broadcast signals of a plurality of channels. Alternatively, the tuner module 110 may be a single turner which receives broadcast signals of a plurality of channels simultaneously.

The demodulator 120 may receive the digital IF (DIF) signal converted by the tuner module 110, and may demodulate the digital IF signal.

For example, the demodulator 120 may convert the digital IF (DIF) signal, which is converted by the tuner module 110, into a baseband signal.

Upon performing demodulation and channel decoding, the demodulator 120 may output a stream signal (TS). Here, the stream signal may be a signal obtained by multiplexing an image signal, an audio signal, or a data signal.

The stream signal, output from the demodulator 120, may be input into the signal processor. Upon performing demultiplexing, A/V signal processing, and the like, the signal processor may output video to the display 180 and audio to the audio output device 185.

The external device interface 130 may be connected to an external device (not shown), e.g., a set-top box 50, to transmit or receive data. To this end, the external device interface 130 may include an A/V input and output device (not shown).

The external device interface 130 may be connected, wirelessly or by wire, to an external device, such as a digital versatile disk (DVD), a Blu-ray, a game console, a camera, a camcorder, a computer (laptop computer), a set-top box, and the like, and may perform an input/output operation with the external device.

The A/V input/output device may receive input of image and audio signals of the external device. A wireless communicator (not shown) may perform short range wireless communication with other electronic devices.

By connection with such wireless communicator (not shown), the external device interface 130 may exchange data with an adjacent mobile terminal 160. Particularly, in a mirroring mode, the external device interface 130 may receive device information, information on executed applications, application images, and the like from the mobile terminal 600.

The network interface 135 serves as an interface for connecting the image display apparatus 100 and a wired or wireless network such as the Internet. For example, the network interface 135 may receive contents or data from the Internet, a content provider, or a network operator over a network.

Further, the network interface 135 may include the wireless communicator (not shown).

The memory 140 may store programs for processing and controlling each signal by the signal processor, or may store processed video, audio, or data signals.

In addition, the memory 140 may also temporarily store video, audio, or data signals input via the external device interface 130. Furthermore, the memory 140 may store information related to a predetermined broadcast channel using a channel memory function of a channel map and the like.

While FIG. 3 illustrates an example where the memory 140 is separately provided from the signal processor, the present disclosure is not limited thereto, and the memory 140 may be included in the signal processor.

The user input interface 150 transmits a signal, input by a user, to the signal processor, or transmits a signal from the signal processor to the user.

For example, the user input interface 150 may transmit/receive user input signals, such as a power on/off signal, a channel selection signal, a screen setting signal, and the like, to and from a remote controller 200; may transfer a user input signal, which is input from a local key (not shown), such as a power key, a channel key, a volume key, or a setting key, to the signal processor; may transfer a user input signal, which is input from a sensor device (not shown) for sensing a user's gesture, to the signal processor; or may transmit a signal from the signal processor to the sensor device (not shown).

The signal processor may demultiplex stream, which is input via the tuner module 110, the demodulator 120, a network interface 135, or the external interface 130, or may process the demultiplexed signals, to generate and output signals for outputting video or audio.

The video signal processed by the signal processor may be input to the display 180 to be output as a video corresponding to the video signal. Further, the video signal processed by the signal processor may be input to an external output device via the external device interface 130.

The audio signal processed by the signal processor may be output to the audio output device 185. Further, the audio signal processed by the signal processor may be input to the external output device through the external device interface 130.

Although not illustrated in FIG. 3, the signal processor may include a demultiplexer, a video processor, and the like, which will be described later with reference to FIG. 4.

In addition, the signal processor may control the overall operation of the image display apparatus 100. For example, the signal processor may control the tuner module 110 to tune to an RF broadcast corresponding to a user selected channel or a prestored channel.

Further, the signal processor may control the image display apparatus 100 by a user command input via the user input interface 150 or an internal program.

For example, the signal processor may control the display 180 to display an image. In this case, the image displayed on the display 180 may be a still image or a video, or a 2D or 3D image.

In addition, the signal processor may control the display 180 to display a predetermined object in the displayed image. For example, the object may be at least one of an accessed web screen (newspaper, magazine, etc.), an Electronic Program Guide (EPG), various menus, a widget, an icon, a still image, a video, or text.

The signal processor may recognize a user's location based on an image captured by a capturing device (not shown). For example, the signal processor may recognize a distance (z-axial coordinates) between the user and the image display apparatus 100. Also, the signal processor may recognize x-axial coordinates and y-axial coordinates in the display 180 corresponding to the user's location.

The display 180 converts a video signal, a data signal, an OSD signal, a control signal which are processed by the signal processor, or a video signal, a data signal, a control signal, and the like which are received via the external device interface 130, to generate a driving signal.

Further, the display 180 may be implemented as a touch screen to be used as an input device as well as an output device.

The audio output device 185 may output sound by receiving an audio signal processed by the signal processor.

The capturing device (not shown) captures a user's image. The capturing device (not shown) may be implemented with a single camera, but is not limited thereto, and may be implemented with a plurality of cameras. The image information captured by the capturing device (not shown) may be input to the signal processor.

The signal processor may sense a user's gesture based on the image captured by the capturing device (not shown), a signal sensed by the sensor device (not shown), or a combination thereof.

The power supply 190 may supply power throughout the image display apparatus 100. Particularly, the power supply 190 may supply power to the signal processor which may be implemented in a form of a system on chip (SOC), the display 180 to display an image, and the audio output device 185 to output an audio.

Specifically, the power supply 190 may include a converter which converts an alternating current into a direct current, and a dc/dc converter which converts the level of the direct current.

The remote controller 200 transmits a user input to the user input interface 150. To this end, the remote controller 200 may use various communication techniques, such as Bluetooth, RF communication, IR communication, Ultra Wideband (UWB), ZigBee, and the like. Further, the remote controller 200 may receive video, audio, or data signals output from the user input interface 150, to display the signals on the remote controller 200 or output the signal thereon in the form of sound.

The above described image display apparatus 100 may be a fixed or mobile digital broadcast receiver capable of receiving digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Figure 4:
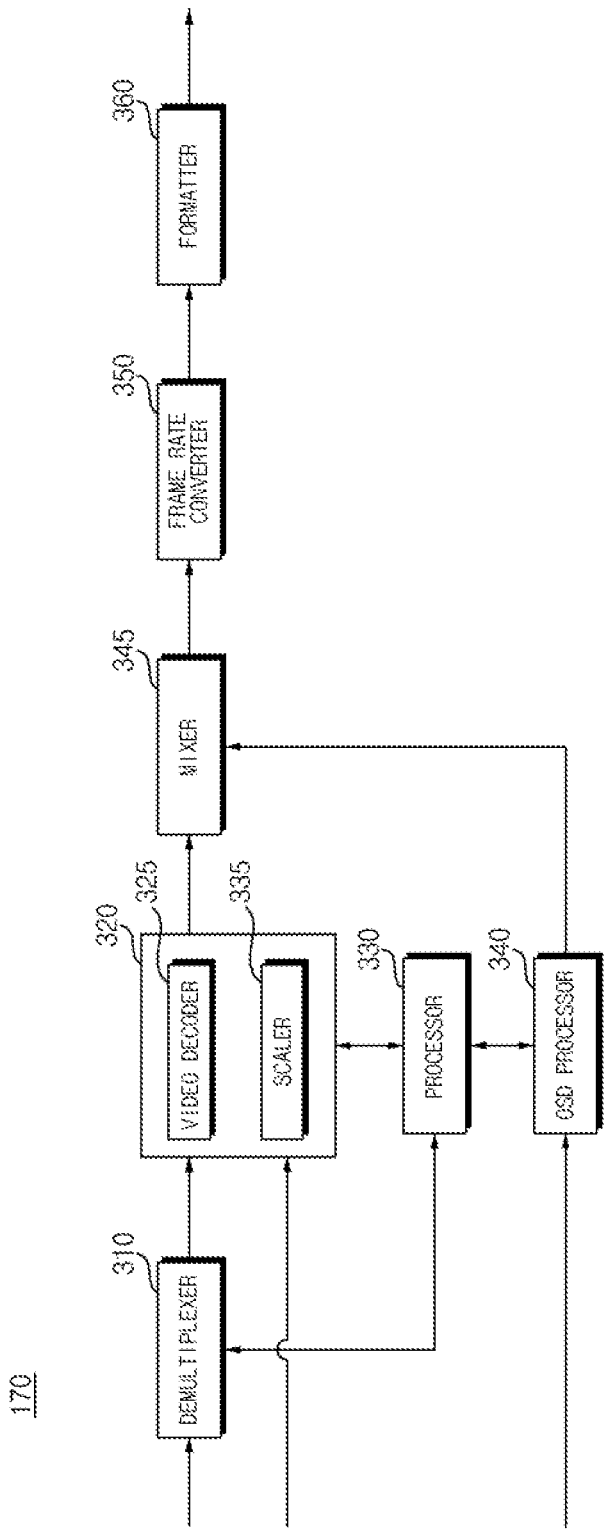
FIG. 4 is an internal block diagram of the controller of FIG. 3.

FIG. 4 is an internal block diagram of the controller of FIG. 3.

Referring to FIG. 4, the signal processor according to an embodiment of the present disclosure includes a demultiplexer 310, a video processor 320, a processor 330, an OSD processor 340, a mixer 345, a frame rate converter 350, and a formatter 360. In addition, the signal processor 170 may further include an audio processor (not shown) and a data processor (not shown).

The demultiplexer 310 demultiplexes an input stream. For example, the demultiplexer 310 may demultiplex an MPEG-2 TS into a video signal, an audio signal, and a data signal. Here, the stream signal input to the demultiplexer 310 may be a stream signal output from the tuner module 110, the demodulator 120, or the external device interface 130.

The video processor 320 may process the demultiplexed video signal. To this end, the video processor 320 may include a video decoder 325 and a scaler 335.

The video processor 325 decodes the demultiplexed video signal, and the scaler 335 scales resolution of the decoded video signal so that the video signal may be displayed on the display 180.

The video decoder 325 may include decoders of various standards. Examples of the video decoder 325 may include an MPEG-2 decoder, an H.264 decoder, a 3D video decoder for decoding a color image and a depth image, a decoder for decoding an image having a plurality of viewpoints, and the like.

The processor 330 may control the overall operation of the image display apparatus 100 or the signal processor. For example, the processor 330 controls the tuner module 110 to tune to an RF signal corresponding to a channel selected by the user or a previously stored channel.

The processor 330 may control the image display apparatus 100 by a user command input through the user input interface 150 or an internal program.

Further, the processor 330 may control data transmission of the network interface 135 or the external device interface 130.

In addition, the processor 330 may control the operation of the demultiplexer 310, the video processor 320, the OSD processor 340 of the signal processor, and the like.

The OSD processor 340 generates an OSD signal autonomously or according to user input. For example, the OSD processor 340 may generate signals by which various types of information are displayed as graphics or text on the display 180 according to a user input signal. The generated OSD signal may include various data such as a User Interface (UI), various menus, widgets, icons, etc. Further, the generated OSD signal may include a 2D object or a 3D object.

The OSD processor 340 may generate a pointer which can be displayed on the display according to a pointing signal received from the remote controller 200. Particularly, such pointer may be generated by a pointing signal processor, and the OSD processor 340 may include such pointing signal processor (not shown). Alternatively, the pointing signal processor (not shown) may be provided separately from the OSD processor 340 without being included therein.

The mixer 345 may mix the OSD signal generated by the OSD processor 340 and the decoded video signal processed by the video processor 320. The mixed video signal is provided to the frame rate converter 350.

The frame rate converter (FRC) 350 may convert a frame rate of an input video. The frame rate converter 350 may output the input video as it is without converting the frame rate.

The formatter 360 may change the format of an input image signal into an image signal for displaying on the display 180 and output the changed image signal.

The formatter 360 may convert the format of a video signal. For example, the formatter 360 may convert the format of a 3D image signal into any one of various 3D formats, such as a side by side format, a top down format, a frame sequential format, an interlaced format, a checker box format, and the like.

The audio processor (not shown) in the signal processor may process the demultiplexed audio signal, or an audio signal of a predetermined content. To this end, the audio processor 370 may include various decoders.

Further, the audio processor (not shown) in the signal processor may also adjust the bass, treble, or volume of the audio signal.

A data processor (not shown) in the signal processor may process the demultiplexed data signal. For example, when the demultiplexed data signal is encoded, the data processor may decode the encoded demultiplexed data signal. Here, the encoded data signal may be Electronic Program Guide (EPG) information including broadcast information such as the start time and end time of a broadcast program which is broadcast through each channel.

The block diagram of the signal processor illustrated in FIG. 4 is by example. The components of the block diagrams may be integrated or omitted, or a new component may be added according to the specifications of the signal processor.

Particularly, the frame rate converter 350 and the formatter 360 may not be included in the signal processor but may be provided individually, or may be provided separately as one module.

Figure 5A:
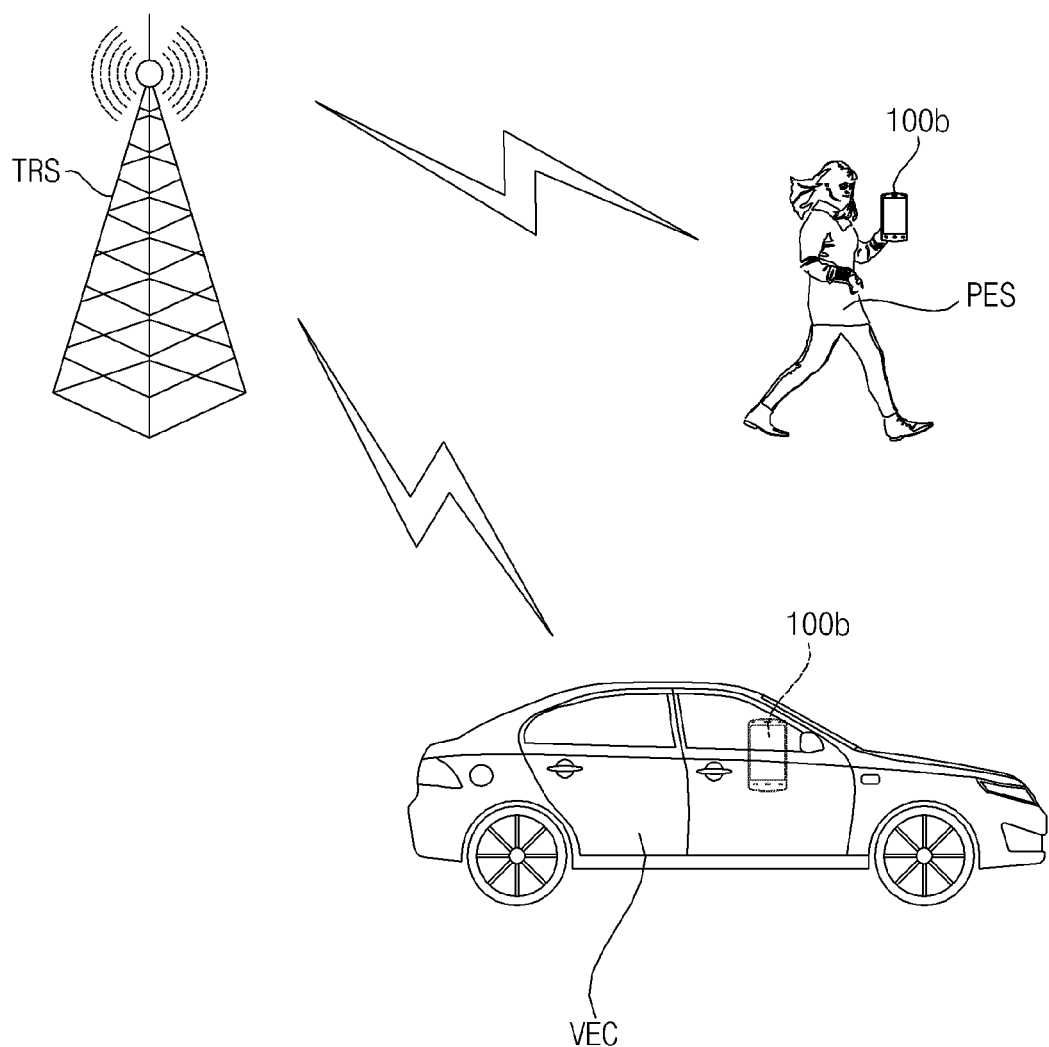
FIGS. 5A to 5B are diagrams for explaining a static channel and a mobile channel.
Figure 5B:
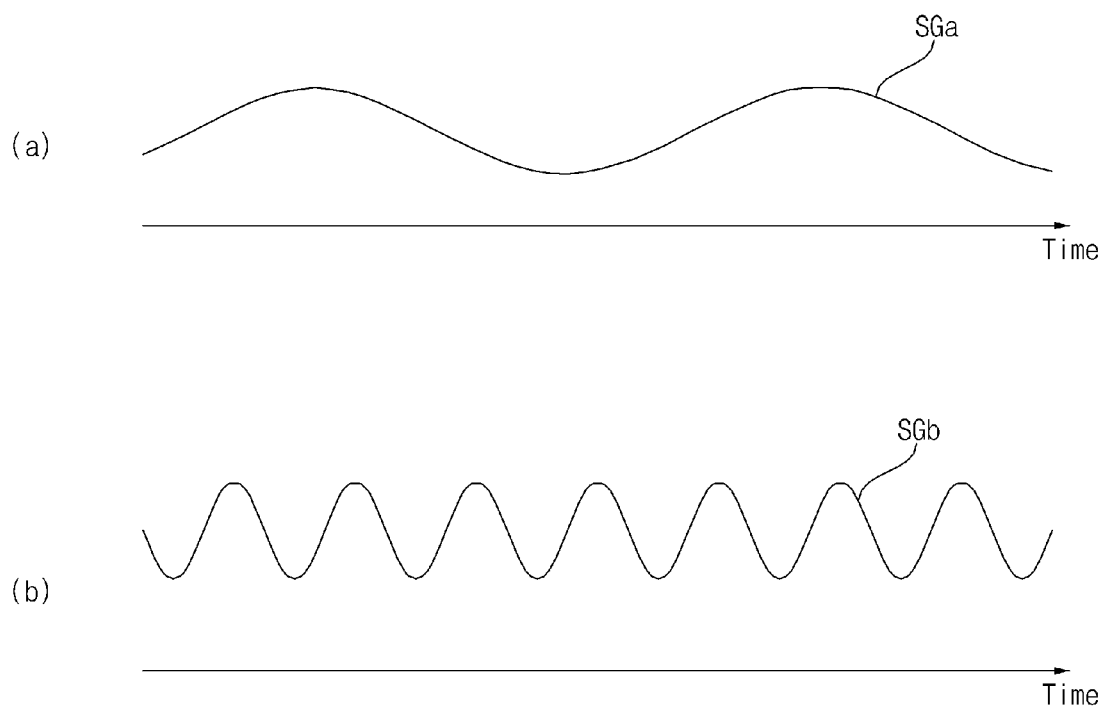

FIGS. 5A to 5B are diagrams for explaining a static channel and a mobile channel.

First, FIG. 5A illustrates an example in which an RF signal output from a base station TRS is received by a mobile terminal 100b of a pedestrian PES or is received by the mobile terminal 100b inside a vehicle VEC.

The mobile terminal 100b of the pedestrian PES may receive the RF signal through a static channel, and the mobile terminal 100b inside the vehicle VEC may receive the RF signal through a mobile channel.

(a) of FIG. 5B is a diagram illustrating an example of a Doppler frequency signal SGa in a static channel. (b) of FIG. 5B is a diagram illustrating an example of a Doppler frequency signal SGb in a mobile channel.

As shown in FIG. 5B, the frequency of the Doppler frequency signal SGb in the mobile channel is higher than the frequency of the Doppler frequency signal SGa in the static channel.

For example, when the moving speed of the pedestrian PES of FIG. 5A is about 4 Km/h, the RF signal may correspond to the Doppler frequency signal SGa in the static channel as shown in (a) of FIG. 5B, and when the moving speed of the vehicle VEC of FIG. 5A is about 80 Km/h, the RF signal may correspond to the Doppler frequency signal SGb in the mobile channel as shown in (b) of FIG. 5B.

Figure 6A:
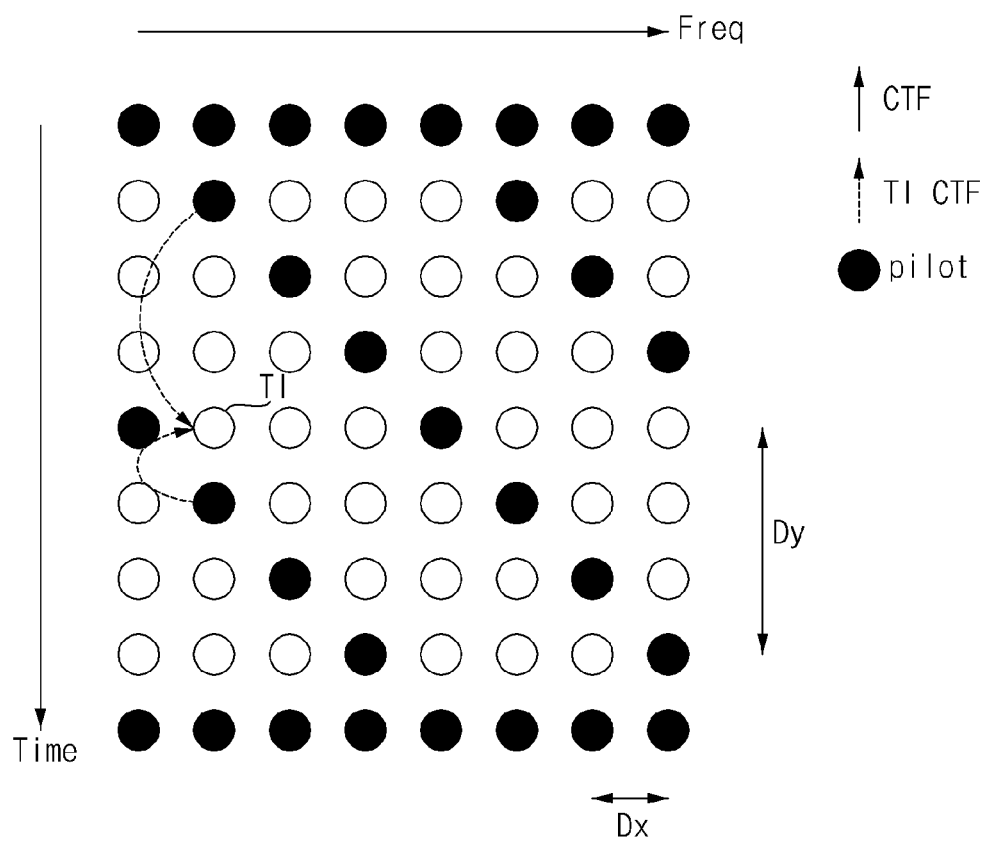
FIGS. 6A to 6C are diagrams for explaining interpolation based on a pilot signal.

FIG. 6A is a diagram for explaining interpolation in the frequency domain and the time domain when an RF signal is an RF signal based on an orthogonal frequency division multiplexing (OFDM) method.

Referring to FIG. 6A, when a pilot signal is extracted from the RF signal, the pilot signal may be indicated in a pilot pattern in the frequency domain on the horizontal axis and the time domain on the vertical axis.

The signal processing device 520 may perform frequency interpolation in a horizontal direction and time interpolation in the vertical direction based on the pilot signal or the pilot pattern.

The signal processing device 520 may acquire an effective symbol or effective data in the RF signal based on this interpolation or the like.

The mobile channel detected by the signal processing device 520 may correspond to a channel that is changed over time due to the Doppler frequency (Doppler speed).

In this case, the channel is changed more over time as the Doppler frequency increases, and thus a channel change between symbols on the time axis in an OFDM symbol may be increased.

The signal processing device 520 may determine a channel change over time using a channel transfer function value of a pilot symbol positioned at an interval dy of the time axis in an OFDM symbol.

Figure 6B:
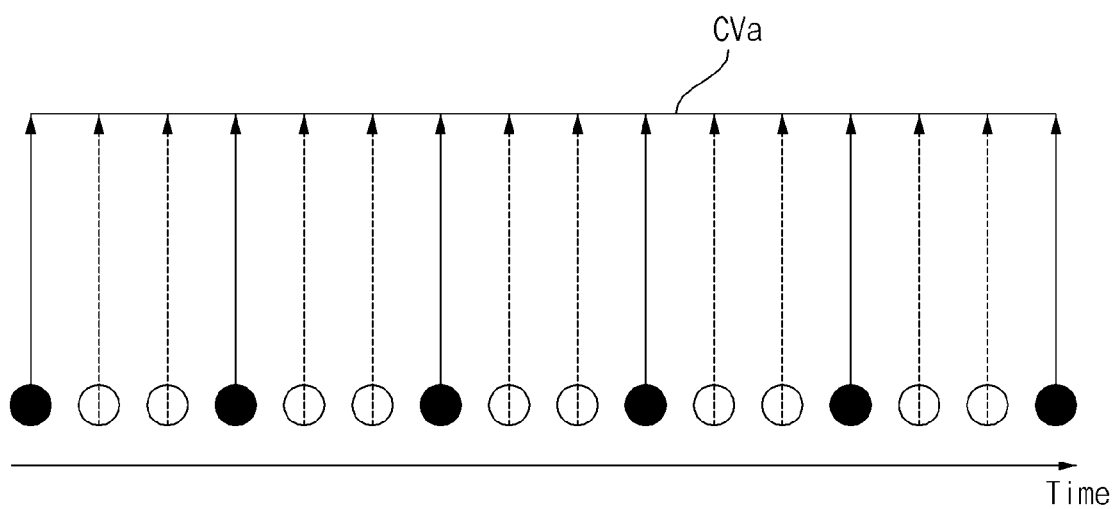

FIG. 6B is a diagram showing an example of time interpolation in a static channel.

Referring to FIG. 6B, the signal processing device 520 may restore a signal CVa corresponding to the static channel by performing time interpolation based on the pilot signal or the pilot pattern.

Figure 6C:
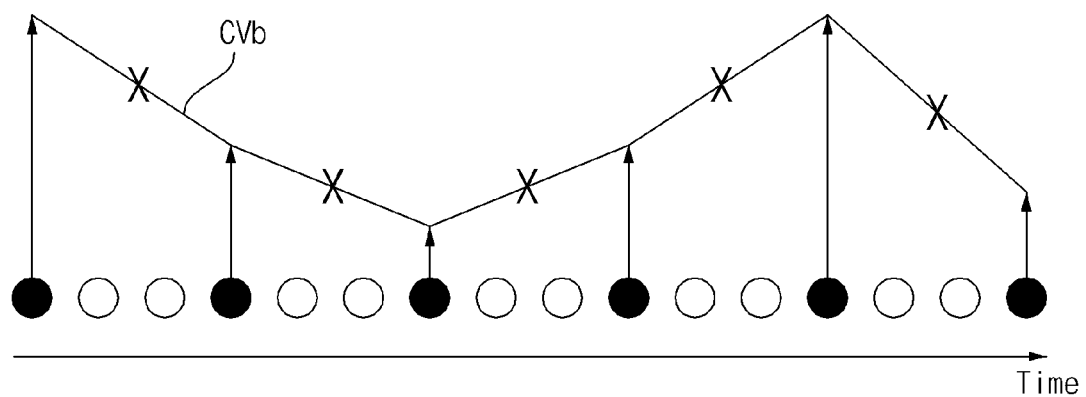

FIG. 6C is a diagram showing an example of time interpolation in a mobile channel.

Referring to FIG. 6C, the signal processing device 520 may restore a signal CVb corresponding to the mobile channel by performing time interpolation based on the pilot signal or the pilot pattern.

In this case, in the mobile channel, when time interpolation is performed, it may be difficult to restore an accurate signal, and accuracy may be remarkably lowered. Thus, in the mobile channel, time interpolation may not be performed.

Figure 7A:
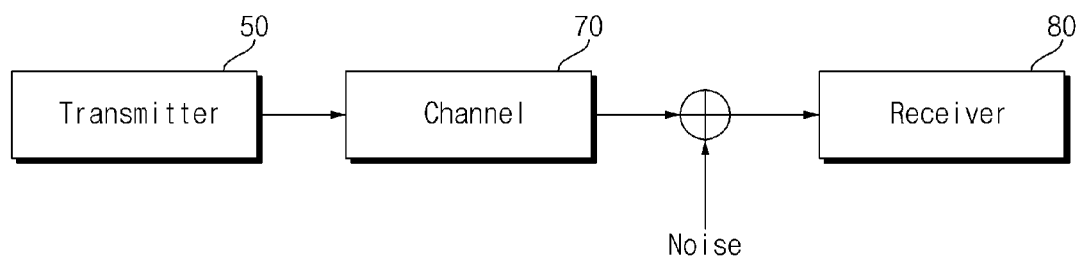
FIG. 7A is a block diagram of an RF signal receiving system according to an embodiment of the present disclosure.

FIG. 7A is a block diagram of an RF signal receiving system according to an embodiment of the present disclosure.

Referring to FIG. 7A, an RF signal receiving system 10 according to an embodiment of the present disclosure may include the wireless signal transmitting device 10 for transmitting an RF signal CA, and the RF receiving device 80 for receiving the RF signal CA.

Meanwhile, a noise signal, derived from a channel 70, may be added to the RF signal CA transmitted by the wireless signal transmitting device 10, and the wireless reception device 80 may receive the RF signal CA, to which the noise signal is added.

Figure 7B:
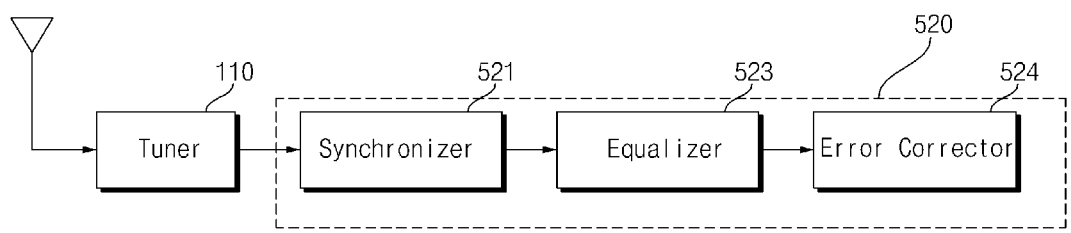
FIG. 7B is a diagram illustrating an example of an RF receiving device according to an embodiment of the present disclosure.

FIG. 7B is a diagram illustrating an example of an RF receiving device according to an embodiment of the present disclosure.

Referring to FIG. 7B, the RF receiving device 80a according to an embodiment of the present disclosure may include the tuner module 110 for receiving an RF signal including noise of a channel and converting the RF signal into a baseband signal, and the signal processing device 520 for performing signal processing on the baseband signal.

In this case, the tuner module 110 may also function as a demodulator. Alternatively, the RF receiving device 80a may also function as the demodulator of FIG. 2.

The signal processing device 520 according to an embodiment of the present disclosure may include the synchronizer 521, the equalizer 523, an error corrector 524, and the like.

The synchronizer 521 may perform synchronization based on an input baseband signal.

The synchronizer 521 may perform synchronization based on a mean squared error (MSE).

For example, the synchronizer 521 may perform synchronization based on a mean squared error (MSE) and may perform synchronization again based on an updated mean squared error (MSE).

The signal processing device 520 may calculate an error e, which is a difference between the input baseband signal and a pilot signal, which is a reference signal, and may output a mean squared error (MSE) based on the calculated error e.

The equalizer 523 may perform equalization based on the signal synchronized by the synchronizer 521.

The equalizer 523 may perform synchronization based on a mean squared error (MSE).

For example, the equalizer 523 may perform synchronization based on a mean squared error (MSE) and may perform synchronization again based on an updated mean squared error (MSE).

The equalizer 523 may perform channel equalization using channel information while performing equalization.

The equalizer 523 may perform interference estimation or channel estimation based on the signal synchronized by the synchronizer 521.

The equalizer 523 may perform interference estimation or channel estimation based on a mean squared error (MSE).

For example, the equalizer 523 may perform interference estimation or channel estimation based on a mean squared error (MSE) and may perform interference estimation or channel estimation based on an updated mean squared error (MSE).

The equalizer 523 may estimate that a communication channel or a broadcast channel includes co-channel interference, adjacent-channel interference, single-frequency interference, burst noise, and phase noise.

The equalizer 523 may also estimate a communication channel or a broadcast channel as any one of a static channel, a mobile channel, and the like.

The static channel may include a Rayleigh channel, a Rician channel, and the like, and the mobile channel may include a vehicular channel, a Doppler channel, and the like.

The error corrector 524 may perform error correction based on the signal (equalization signal) equalized by the equalizer 523. In particular, the error corrector 524 may perform forward error correction.

In this case, the mean squared error (MSE) may be performed based on the signal from the equalizer 523.

The error corrector 524 may perform error correction based on the optimized mean squared error (MSE), thereby accurately performing error correction.

The error corrector 524 may accurately perform error correction even in the presence of interference related to burst noise.

The error corrector 524 may accurately perform error correction in consideration of that the communication channel is a static channel.

The error corrector 524 may accurately perform error correction in consideration of that the communication channel is a mobile channel.

Figure 7C:
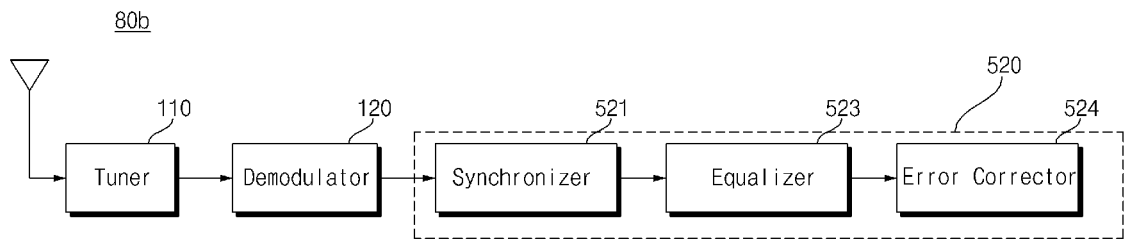
FIG. 7C illustrates an example of a block diagram of an RF receiving device according to another embodiment of the present disclosure.

FIG. 7C illustrates an example of a block diagram of an RF receiving device according to another embodiment of the present disclosure.

Referring to FIG. 7C, an RF receiving device 80b of FIG. 7C may be similar to the wireless reception device 80 of FIG. 7B, but may be different therefrom in that the demodulator 120 is further included between the tuner module 110 and the signal processing device 520.

The tuner module 110 of FIG. 7C may receive an RF signal including noise from a channel and may convert the RF signal into an intermediate frequency signal, and the demodulator 120 may convert the intermediate frequency signal into a baseband signal.

The signal processing device 520 may perform signal processing on the baseband signal from the demodulator 120, as described with reference to FIG. 7B.

Figure 7D:
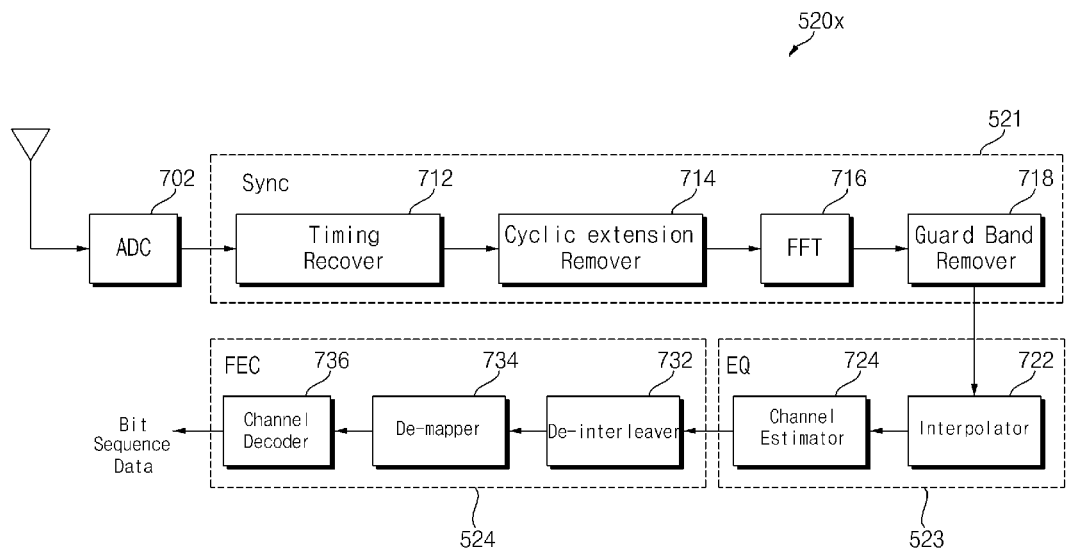
FIG. 7D illustrates an example of an internal block diagram of a signal processing device related to the present disclosure.

FIG. 7D illustrates an example of an internal block diagram of a signal processing device related to the present disclosure.

Referring to FIG. 7D, a conventional signal processing device 520x receives a digital signal from an analog-digital-converter (ADC) 702. Here, the digital signal may be a baseband signal.

Meanwhile, the signal processing device 520x may include the synchronizer 521, the equalizer 523, and the error corrector 524.

The synchronizer 521 may include a timing restorer 712 for performing timing recovery based on a received baseband signal, a prefix remover 714 for removing a cyclic prefix from the signal received from the timing restorer 712, a Fourier transformer 716 for performing fast Fourier transform (FFT) on the signal received from the prefix remover 714, and a guard band remover 718 for removing a guard band from the signal received from the Fourier transformer 716.

The equalizer 523 may include an interpolator 722 extracting a pilot signal from the signal received from the synchronizer 521 and a channel estimator 724 performing channel estimation based on a signal interposed by the interpolator 722.

Then, the error corrector 524 may include a deinterleaver 732 for performing deinterleaving based on the signal of the equalizer 523, a demapper 734 for performing demapping, and a channel decoder 736 for performing channel decoding. Thus, the error corrector 524 may perform forward error correction, and may finally output bit sequence data.

Figure 8A:
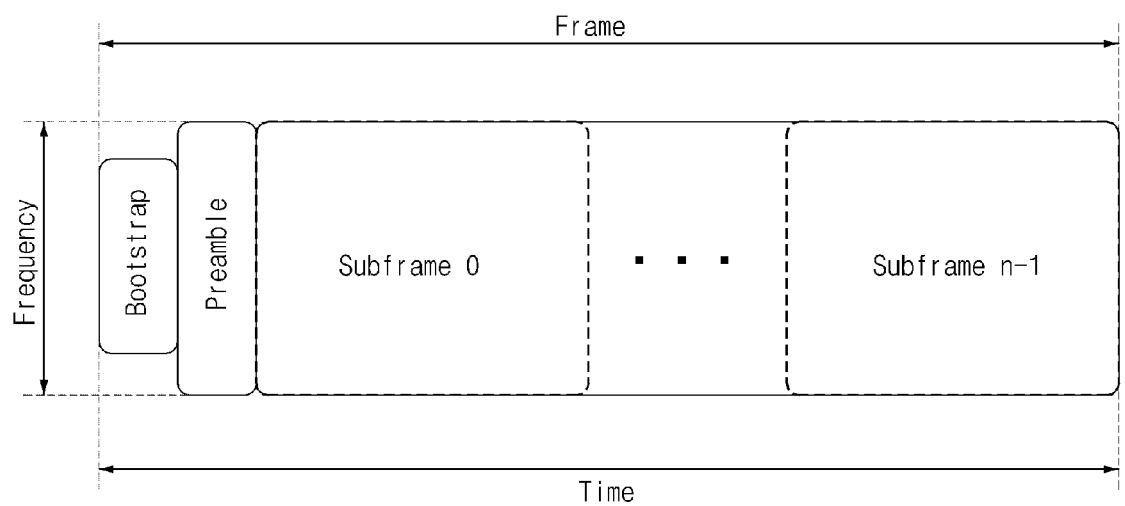
FIG. 8A is a diagram illustrating a frame structure according to an ATSC 3.0 standard.

The RF signal CA of FIG. 1 may be a digital broadcasting signal, and in this case, the RF receiving device 80 of FIG. 1 may be included in an image display device 100 (refer to FIG. 2A) such as a TV or a mobile terminal 100b (refer to FIG. 2B) such as a cellular phone or a tablet terminal. FIG. 8A is a diagram illustrating a frame structure according to an ATSC 3.0 standard.

Referring to FIG. 8A, frame data according to the ATSC 3.0 standard may include bootstrap data, preamble data, and a plurality of subframe data subframe 0, . . . , subframe n-1

Figure 8B:
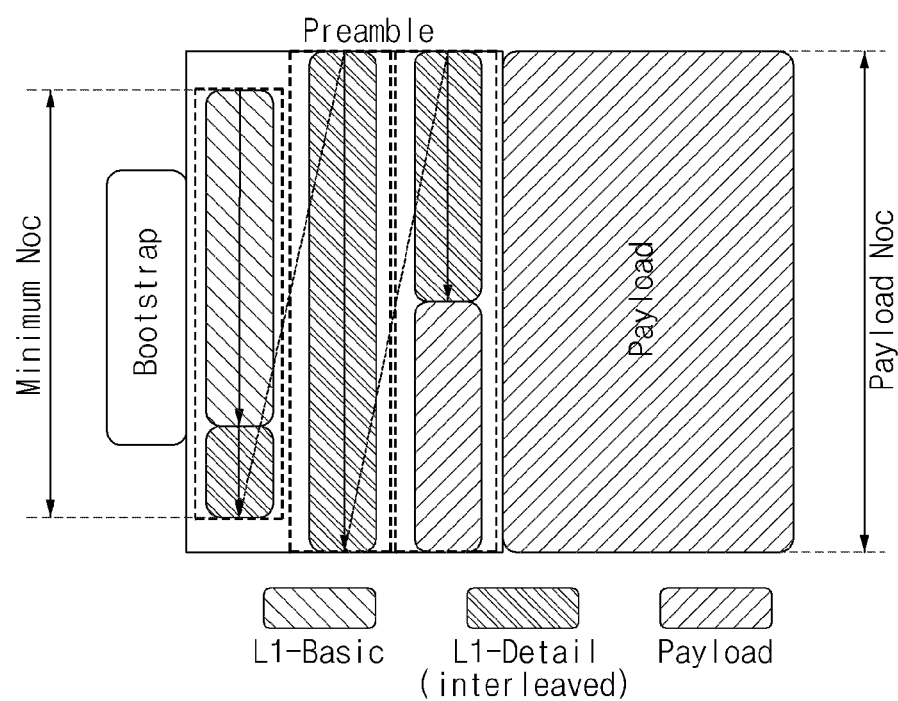
FIG. 8B is a diagram illustrating basic signaling data and detail signaling data of preamble data of FIG. 8A.

FIG. 8B is a diagram illustrating basic signaling data and detail signaling data of preamble data of FIG. 8A.

Referring to FIG. 8B, the preamble data according to the ATSC 3.0 standard may include L1 basic signaling data and L1 detail signaling data.

Meanwhile, after the preamble data according to the ATSC 3.0 standard, the payload data is shown.

The L1 detail signaling data may have a larger amount than the L1 basic signaling data.

In particular, the amount of the L1 basic signaling data may be smaller than minimum NOC information.

Meanwhile, the amount of the L1 detail signaling data may be larger than the minimum NOC information.

Meanwhile, according to the ATSC 3.0 standard of FIGS. 8A and 8B, only when decoding the bootstrap data should be completed, the L1 basic signaling data may be decoded.

In particular, the L1 basic signaling data may include information required for decoding the L1 detail signaling data and parameter information required for data processing of a first subframe.

Meanwhile, the L1 detail signaling data may include parameter information required for data processing after a second subframe.

Accordingly, in the signal processing device $520x$ illustrated in FIG. 7D, when the frame data of the ATSC 3.0 standard of FIGS. 8A and 8B is processed, the number of preambles, the number of subframes, whether there is a subframe boundary symbol, a pilot pattern, etc., are determined, only minimum data for decoding the L1 detail signaling data is stored, and the L1 basic signaling data and the L1 detail signaling data are acquired, and then the data of the subframe is processed after a second frame.

Meanwhile, in order to process the data of the subframe from the first frame, since all data should be stored during decoding the L1 basic signaling data and the L1 detail signaling data, it is difficult to handle the storing of all data in hardware.

Therefore, in the embodiment of the present disclosure, a method that may process the payload data of the first frame data within the first frame data period Pra or the reception period Pra of the first frame data is presented. That is, a method that may shorten the data output time according to the processing of the frame data is presented. This will be described with reference to FIG. 9.

Figure 9:
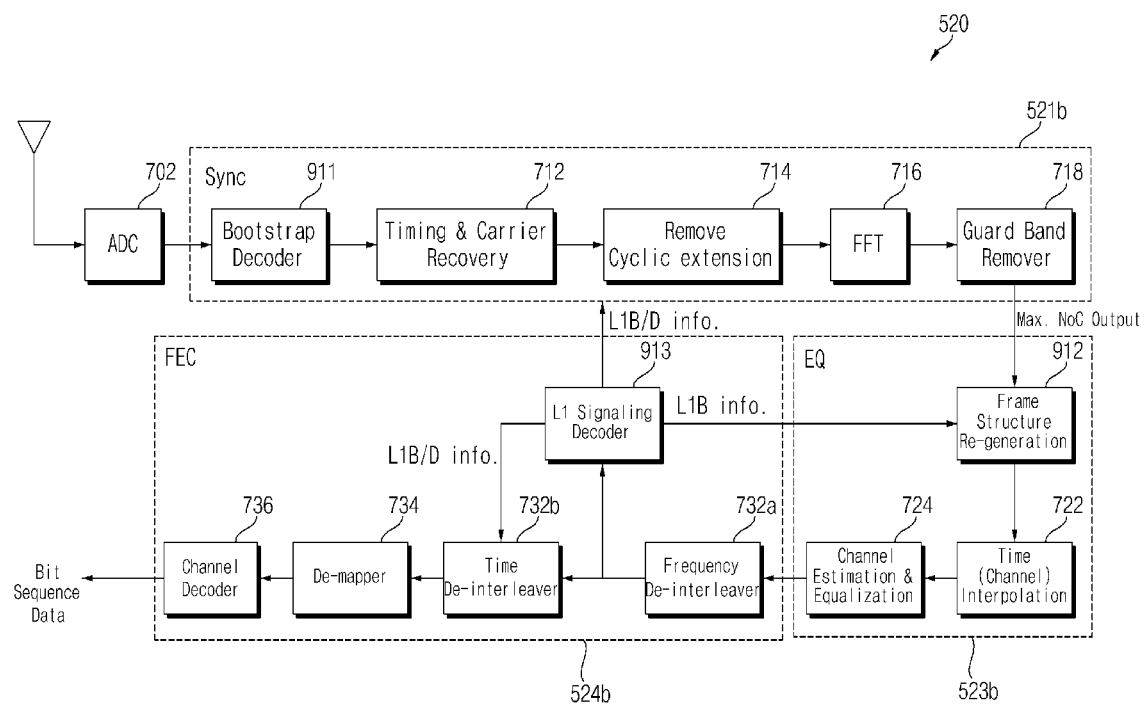
FIG. 9 illustrates an example of an internal block diagram of a signal processing device according to an embodiment of the present disclosure.

FIG. 9 illustrates an example of an internal block diagram of a signal processing device according to an embodiment of the present disclosure and FIGS. 10A to 12 are diagrams referenced for explaining an operation of FIG. 9.

First, referring to FIG. 9, the signal processing device 520 according to an embodiment of the present disclosure receives a digital signal from an analog-digital-converter (ADC) 702. Here, the digital signal may be the baseband signal.

Meanwhile, the signal processing device 520 according to an embodiment of the present disclosure includes a synchronizer $512b$ decoding bootstrap data of first frame data within a received baseband signal, and an error corrector $524b$ including a signaling decoder 913 decoding basic signaling data of the first frame data.

In addition, the signal processing device 520 according to an embodiment of the present disclosure may process the payload data of the first frame data within the first frame data period Pra or the reception period Pra of the first frame data. Accordingly, the data output time according to the processing of the frame data can be shortened. In particular, the payload data of the first frame data may be processed within the first frame data period Pra or the reception period Pra of the first frame data.

Meanwhile, the signal processing device 520 according to an embodiment of the present disclosure further includes an equalizer $523b$ reconfiguring a preamble of a first frame and a first subframe based on basic signaling data L1B info of the first frame data decoded by the signaling decoder 913.

The equalizer $523b$ may receive a signal from the synchronizer $521b$, and output an output signal to the error corrector $524b$.

The synchronizer $512b$ may include a bootstrap decoder 911 decoding the bootstrap data of the first frame data within the received baseband signal.

Meanwhile, the synchronizer $521b$ may include a timing restorer 712 for performing timing recovery based on the signal from the bootstrap decoder 911, a prefix remover 714 for removing a periodic cyclic prefix from the signal received from the timing restorer 712, a Fourier transformer 716 for performing fast Fourier transform (FFT) on the signal from the prefix remover 714, and a guard band remover 718 for removing a guard band from the signal from the Fourier transformer 716.

Meanwhile, the synchronizer $521b$ may receive basic signaling data L1B info of the first frame data and detail signaling data L1D info of the first frame data, from the signaling decoder 913 in the error corrector $524b$.

In addition, the synchronizer $521b$ may perform Fourier transform in the Fourier transformer 716 and the guard band removal in the guard band remover 718 based on the basic signaling data L1B info of the first frame data and the detail signaling data L1D info of the first frame data.

The equalizer $523b$ may include a frame reconfigurer 912 reconfiguring the preamble of the first frame and the first subframe based on the basic signaling data L1B info of the first frame data.

Meanwhile, the equalizer $523b$ may include an interpolator 722 extracting a pilot signal from the signal received from the synchronizer 521 and a channel estimator 724 extracting the pilot signal, calculating a channel transfer function value of the extracted pilot signal, and performing channel estimation based on the calculated channel transfer function value.

Meanwhile, the interpolator 722 may perform time interpolation and frequency interpolation based on the calculated channel transfer function value.

Meanwhile, the channel estimator 724 in the equalizer $523b$ may perform channel equalization by using channel information after performing channel estimation or interpolation. For example, the equalizer $523b$ may perform the channel equalization in a time or frequency domain.

Then, the error corrector $524b$ may include a frequency deinterleaver $732a$ performing frequency interleaving based on the signal of the equalizer $523b$, and a signaling decoder 913 decoding the basic signaling data L1B info of the first frame data and the detail signaling data L1D info of the first frame data based on the frequency-deinterleaved signal.

The basic signaling data L1B info of the first frame data decoded by the signaling decoder 913 and the detail signaling data L1D info of the first frame data may be output to the synchronizer $521b$ and the time deinterleaver $732b$.

Meanwhile, the basic signaling data L1B info of the first frame data decoded by the signaling decoder 913 may be input into the frame reconfigurer 912 in the equalizer $523b$.

Meanwhile, the error corrector $524b$ may further include a time deinterleaver $732b$ performing time deinterleaving, a demapper 734 performing demapping, and a channel decoder 736 performing channel decoding based on the frequency-deinterleaved signal, the basic signaling data L1B info of the first frame data, and the detail signaling data L1D info of the first frame data. Thus, the error corrector 524 may perform forward error correction, and may finally output bit sequence data.

Meanwhile, upon power on or changing a channel of an RF signal, processing the payload data of the first frame data is started within the first frame data period or the reception period of the first frame data by the signaling processing device 520 according to an embodiment of the present disclosure. Accordingly, the data output time according to the processing of the frame data can be shortened.

Meanwhile, when the basic signaling data L1B info of the first frame data is decoded by the signaling decoder 913, the synchronizer 512b and the equalizer 523b may operate and output signals, respectively. Accordingly, the data output time according to the processing of the frame data can be shortened.

Figure 10A:
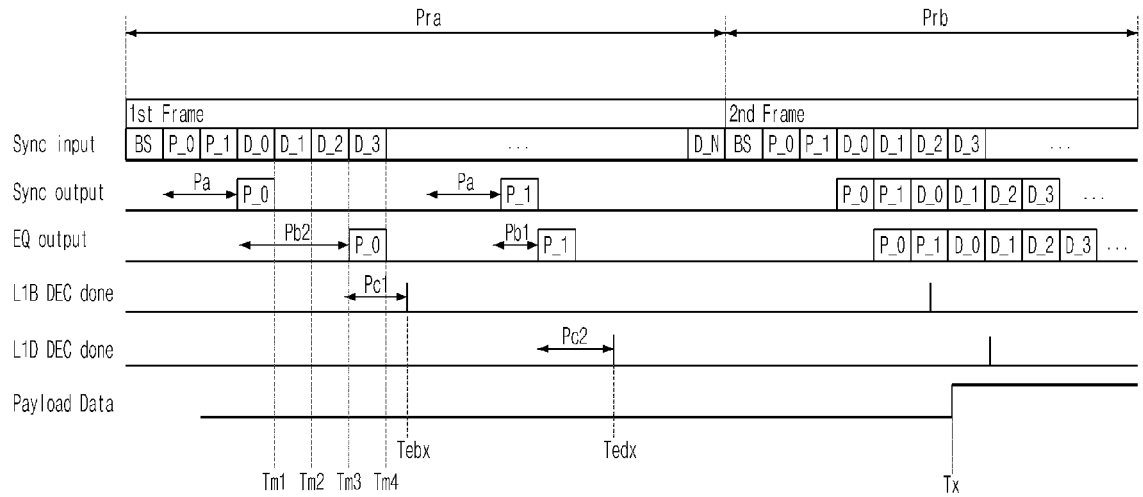
FIGS. 10A to 12 are diagrams referenced for explaining an operation of FIG. 9.

FIG. 10A is a timing diagram illustrating a method for processing an ATSC 3.0 signal in the related art for comparison with the present disclosure. For example, FIG. 10A is a timing diagram illustrating a method for processing an ATSC 3.0 signal of FIG. 7D.

Referring to FIG. 10A, during the first frame data period Pra or the reception period Pra of the first frame data, bootstrap data BS, first preamble data P_0, second preamble data P_1, first subframe data D_0, second subframe data D_1, third subframe data D_2, and fourth subframe data D_3 are sequentially input into the synchronizer 521.

Meanwhile, input completion times of the first subframe data D_0, the second subframe data D_1, the third subframe data D_2, and the fourth subframe data D_3 may be Tm1, Tm2, Tm3, and Tm4, respectively.

Meanwhile, the synchronizer 521 performs signal processing during a period Pa and outputs the first preamble data P_0.

In this case, an output completion time of the first preamble data P_0 in the synchronizator 521 may be Tm1.

Then, the equalizer 523 performs signal processing during a period Pb2 longer than the period Pa and outputs the first preamble data P_0.

In this case, an output completion time of the first preamble data P_0 in the equalizer 523 may be Tm4.

Thereafter, the error corrector 524 performs signal processing during a period Pc1 to complete decoding of the basic signaling data L1B info of the first frame data at a time Tebx.

In addition, after completing decoding of the basic signaling data L1B info of the first frame data, the synchronizer 521 performs signal processing during the period Pa and outputs the second preamble data P_1.

Then, the equalizer 523 performs signal processing and outputs the second preamble data P_1.

Thereafter, the error corrector 524 performs signal processing during a period Pc2 to complete decoding of the detail signaling data L1D info of the first frame data at a time Tedx.

As such, after completing decoding of the basic signaling data L1B info of the first frame data, the signal processing of the second preamble data P_1 is performed to delay overall signal processing.

In particular, a signal processing time Tx of the payload data is not within the first data period Pra or the reception period Pra of the first frame data, but within a second frame data period Prb or a reception period Prb of the second frame data.

Therefore, if a frame duration is 5 s in approximately 50 ms, the first frame period is delayed.

Figure 10B:
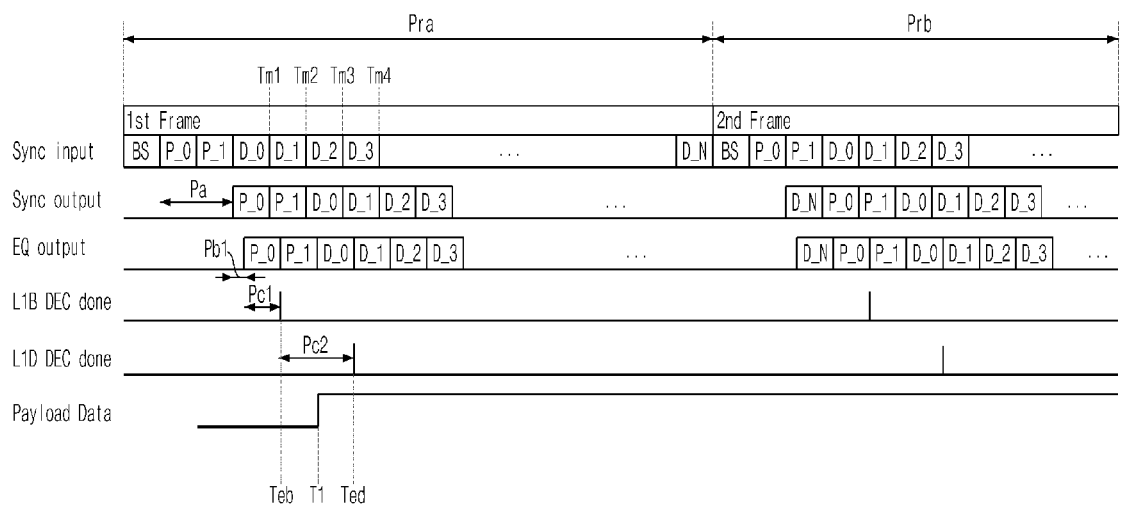

FIG. 10B is a timing diagram illustrating a method for processing an ATSC 3.0 signal according to an embodiment of the present disclosure. For example, FIG. 10B is a timing diagram illustrating a method for processing an ATSC 3.0 signal of FIG. 9.

Referring to FIG. 10B, during the first frame data period Pra or the reception period Pra of the first frame data, bootstrap data BS, first preamble data P_0, second preamble data P_1, first subframe data D_0, second subframe data D_1, third subframe data D_2, and fourth subframe data D_3 are sequentially input into a synchronizer 521.

Meanwhile, input completion times of the first subframe data D_0, the second subframe data D_1, the third subframe data D_2, and the fourth subframe data D_3 may be Tm1, Tm2, Tm3, and Tm4, respectively.

Meanwhile, the synchronizer 521b performs signal processing during the period Pa, and sequentially outputs the first preamble data P_0, the second preamble data P_1, the first subframe data D_0, the second subframe data D_1, the third subframe data D_2, and the fourth subframe data D_3.

In this case, output completion times of the first preamble data P_0, the second preamble data P_1, the first subframe data D_0, and the second subframe data D_1 in the synchronizer 521b may be Tm1, Tm2, Tm3, and Tm4, respectively.

Then, the equalizer 523b performs signal processing during a period Pb1 longer than the period Pa and outputs the first preamble data P_0.

In particular, the equalizer 523b may output the first preamble data P_0 between Tm1 and Tm2 by starting the signal processing in advance before outputting the first preamble data P_0 in the synchronizer 521b.

Meanwhile, the equalizer 523b sequentially outputs the first preamble data P_0, the second preamble data P_1, the first subframe data D_0, the second subframe data D_1, third subframe data D_2, and the fourth subframe data D_3 after Tm1.

Then, the signaling decoder 913 in the error corrector 524b may output the decoded basic signaling data of the first frame data between Tm1 and Tm2 by starting decoding the basic signaling data L1B info of the first frame data before the time Tm1.

Meanwhile, the signaling decoder 913 in the error corrector 524b may perform signal processing during the period Pc1 shorter than the period Pa, and output the decoded basic signaling data L1B info of the first frame data.

In this case, the decoding completion time or the output time of the basic signaling data L1B info of the first frame data may be Teb.

Meanwhile, since the equalizer 523b sequentially outputs the first preamble data P_0, the second preamble data P_1, the first subframe data D_0, the second subframe data D_1, the third subframe data D_2, and the fourth subframe data D_3 after Tm1, the signaling decoder 913 in the error corrector 524b may decode the detail signaling data L1D info of the first frame data immediately after completing the decoding of the basic signaling data L1B info of the first frame data.

Meanwhile, the signaling decoder 913 in the error corrector 524b may perform signal processing during the period Pc2 shorter than the period Pc1, and output the decoded detail signaling data L1D info of the first frame data.

In this case, the decoding completion time or the output time of the detail signaling data L1D info of the first frame data may be Ted.

Meanwhile, since the equalizer 523b sequentially outputs the first preamble data P_0, the second preamble data P_1, the first subframe data D_0, the second subframe data D_1, the third subframe data D_2, and the fourth subframe data D_3 after Tm1, a signal processing time T1 of the payload data may be within the first frame data period Pra or the reception period Pra of the first frame data.

In FIG. 10B, it is illustrated that the signal processing time T1 of the payload data is after the decoding completion time Teb of the basic signaling data L1B info of the first frame data and before the decoding completion time Ted of the detail signaling data L1D info of the first frame data.

Accordingly, the data output time according to the processing of the frame data can be shortened. In particular, the payload data of the first frame data may be processed within the first frame data period Pra or the reception period Pra of the first frame data.

Therefore, signal processing and output become possible immediately after the first frame data.

Meanwhile, the decoding completion time Teb of the basic signaling data L1B info of the first frame data may be after the input completion time Tm1 of the first subframe data D_0 of the first frame data input into the synchronizer 521b and before the input completion time Tm2 of the second subframe data D_1 of the first frame data. Accordingly, the data output time according to the processing of the frame data can be shortened.

Meanwhile, the decoding completion time Teb of the basic signaling data L1B info of the first frame data may be after the output completion time Tm1 of the first preamble data P_0 of the first frame data input into the synchronizer 521b, and before the output completion time Tm2 of the second preamble data P_1 of the first frame data output from the synchronizer 521b or before the output completion time of the first subframe data D_0 of the first frame data output from the synchronizer 521b. Accordingly, the data output time according to the processing of the frame data can be shortened.

Meanwhile, the decoded basic signaling data L1B info of the first frame data may include number information of preambles of the first frame and reduced carrier mode information of the first subframe. Accordingly, the data output time according to the processing of the frame data can be shortened.

Meanwhile, the signaling decoder 913 may decode the detail signaling data L1D info of the first frame data after completing the decoding of the basic signaling data L1B info of the first frame data. Accordingly, the data output time according to the processing of the frame data can be shortened.

Meanwhile, the decoding completion time Ted of the detail signaling data L1D info of the first frame data may be after the input completion time Tm3 of the third subframe data D_2 of the first frame data input into the synchronizer 521b and before the input completion time Tm4 of the fourth subframe data D_3 of the first frame data. Accordingly, the data output time according to the processing of the frame data can be shortened.

Meanwhile, the decoding completion time Ted of the detail signaling data L1D info of the first frame data may be before the output completion time of the second subframe data D_1 of the first frame data output from the synchronizer 521b. Accordingly, the data output time according to the processing of the frame data can be shortened.

FIG. 10C is a diagram illustrating a syntax of the basic signaling data L1B info.

Referring to FIG. 10C, L1B_papr_reduction, L1B_framer_length_mode, L1B_preamble_reduced_carriers, L1B_first_sub_fft_size, L1B_first_sub_reduced_carriers, L1B_first_sub_guard_interval, L1B_first_sub_scattered_pilot_pattern, and L1B_first_sub_scattered_pilot_boost represent parameter information required for a symbol unit operation.

Meanwhile, L1B_num_subframes, L1B_preamble_num_symbols, L1B_first_sub_num_ofdm_symbols, L1B_first_sub_sbs_first, and L1B_first_sub_guard_last represent parameter information required for reconfiguring the frame structure.

Accordingly, the frame reconfigurer 912 may reconfigure the frame structure by utilizing L1B_num_subframes, L1B_preamble_num_symbols, L1B_first_sub_num_ofdm_symbols, L1B_first_sub_sbs_first, and L1B_first_sub_guard_last in the basic signaling data L1B info.

Meanwhile, data of L1B_preamble_reduced_carriers and L1B_first_sub_reduced_carriers may be used for an operation start time of the equalizer 523b.

The synchronizer 521b may output maximum carrier number information Max Noc.

FIG. 10D illustrates information on the number of carriers (Noc) for each FFT mode (8K FFT, 16K FFT, and 32K FFT) when a variable of a reduced carrier mode has a value of 0 to 4.

Meanwhile, the equalizer 523b may operate from a time delayed further than a start time the maximum number information of carriers (Max Noc) received from the synchronizer 521b by an offset period after decoding the basic signaling data L1B info of the first frame data.

Figure 11A:
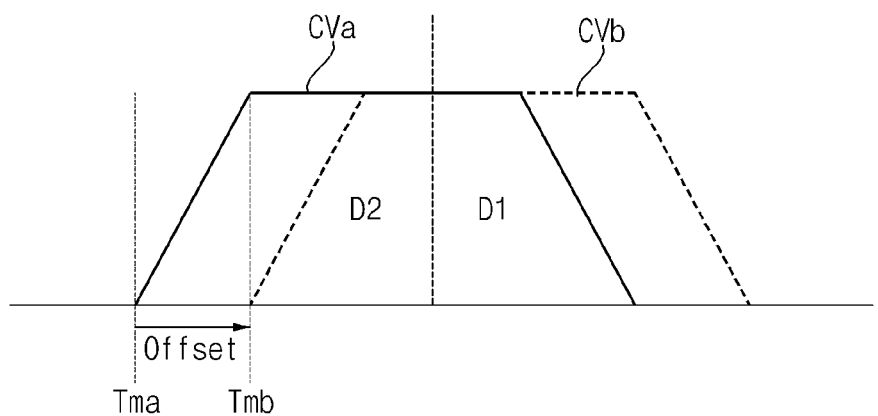
Figure 11B:
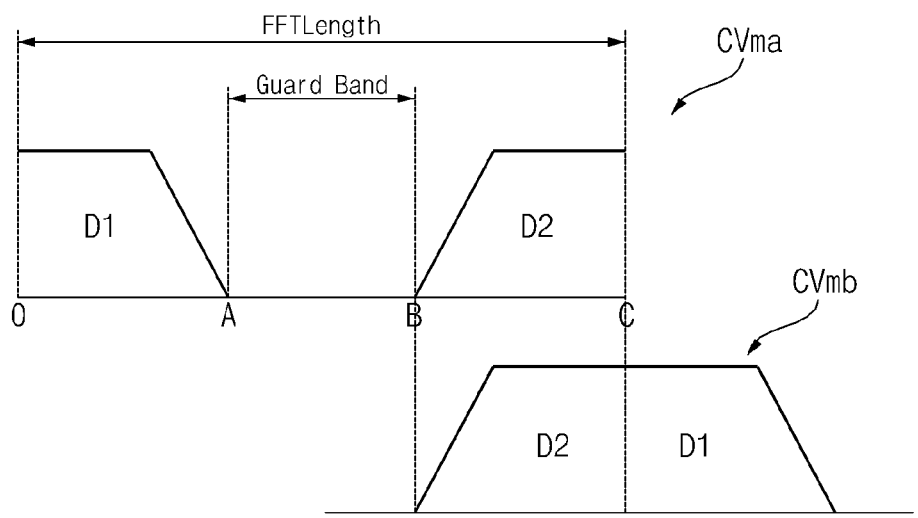
Figure 12:
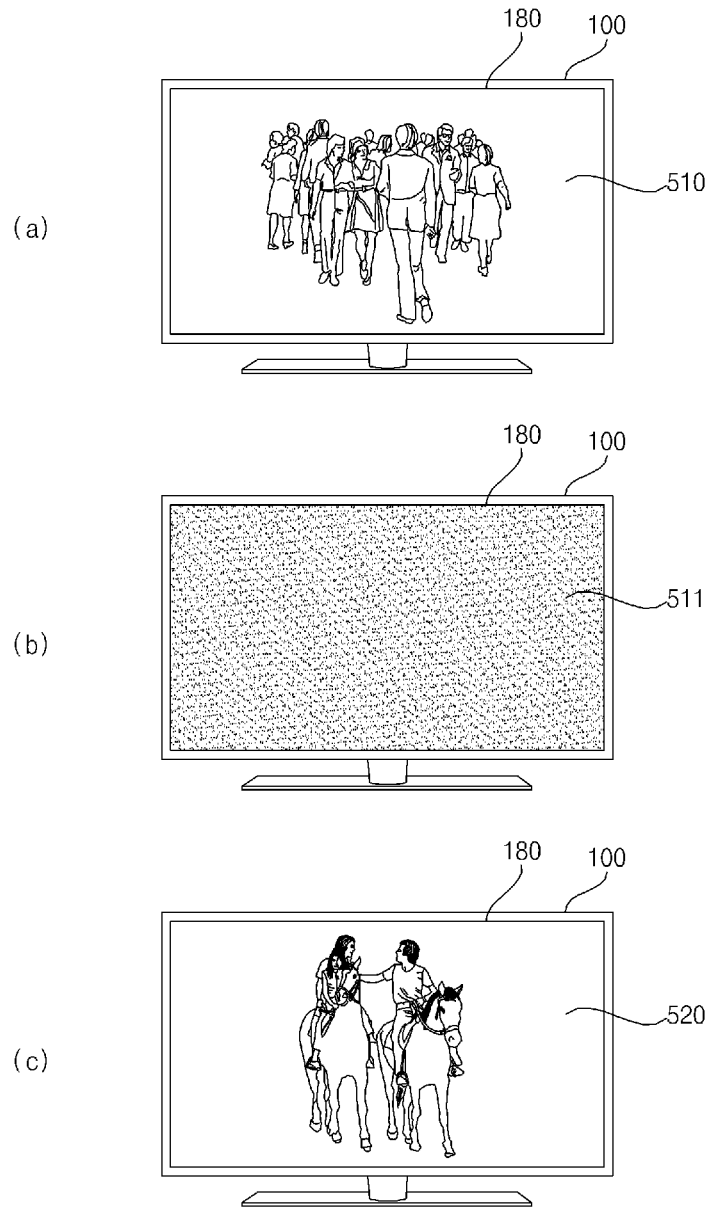

FIG. 11B illustrates a graph CVma according to Fourier transform in the synchronizer 521b and a graph CVMb according to guard band removal in the synchronizer 521b.

Consequently, the synchronizer 521b may output the graph CVMb according to the guard band removal.

Meanwhile, FIG. 11A is a diagram illustrating operation time variation of the equalizer 523b.

Referring to FIG. 11Aa, the equalizer 523b may operate at a time Tmb delayed further than a start time Tma of information on the maximum number of carriers (Max Noc) received from the synchronizer 521b by an offset.

Meanwhile, when the basic signaling data L1B info of the first frame data is received after completing the decoding of the basic signaling data L1B info of the first frame data, partial time delay is required for a normal operation according to parameters in the received basic signaling data as illustrated in FIG. 10C.

Therefore, as illustrated in FIG. 11A, the equalizer 523b may operate based on the graph CVb rather than the graph CVa.

With the change of the start time, only a valid sub-carrier may be used.

FIG. 12A illustrates that a broadcasting image 510 is displayed in a display 180 of the image display apparatus 100 when processing the payload data of the frame data is started within the first frame data period Pra or the reception period Pra of the first frame data as illustrated in FIG. 9 or 10B.

Accordingly, the broadcasting image 510 may be displayed from the first frame period.

FIG. 12B illustrates that a defective image 511 is displayed as illustrated in FIG. 12B when processing the payload data of the frame data is not started within the first frame data period Pra or the reception period Pra of the first frame data as illustrated in FIG. 7D or 10A.

FIG. 12C illustrates that a broadcasting image 520 is displayed as illustrated in FIG. 12C when processing the payload data of the frame data is not started during the second frame data period Prb or the reception period Prb of the second frame data as illustrated in FIG. 7D or 10A.

Meanwhile, the signal processing device or the operating method of the image display apparatus according to the present invention may be implemented as a processor readable code in a processor readable recording medium provided in the signal processing device or the image display apparatus. The processor readable recording medium includes all kinds of recording devices storing data which may be deciphered by a processor. Further, the processor readable recording media may be stored and executed as codes which may be distributed in the computer system connected through a network and read by the processor in a distribution method.

Further, although the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

The present disclosure is applicable to the signaling processing device and the image display apparatus including the same.

What is claimed is:

1. A signal processing device for demodulating a radio frequency (RF) signal received through a channel and processing a demodulated baseband signal, the signal processing device comprising:
    a synchronizer configured to decode bootstrap data of first frame data in the received baseband signal; and
    an error corrector including a decoder configured to decode basic signaling data of the first frame data,
    wherein processing payload data of the first frame data is started within a first frame data period or a reception period of the first frame data,
    wherein a decoding completion time of the basic signaling data of the first frame data is after an output completion time of first preamble data of the first frame data output by the synchronizer, and before an output completion time of second preamble data of the first frame data output by the synchronizer or before an output completion time of first subframe data of the first frame data output by the synchronizer.

2. The signal processing device of claim 1, further comprising:
    an equalizer configured to reconfigure a preamble of a first frame and a first subframe based on the basic signaling data of the first frame data decoded from the decoder.

3. The signal processing device of claim 2, wherein the equalizer includes a frame reconfigurer configured to reconfigure the preamble of the first frame and the first subframe based on the basic signaling data of the first frame data decoded from the decoder.

4. The signal processing device of claim 3, wherein the decoder is further configured to transmit the decoded basic signaling data of the first frame data to the synchronizer and the frame reconfigurer in the equalizer.

5. The signal processing device of claim 2, wherein upon power on or changing a channel of the RF signal, processing the payload data of the first frame data is started within the first frame data period or the reception period of the first frame data.

6. The signal processing device of claim 2, wherein in response to the decoder decoding the basic signaling data of the first frame data, the synchronizer and the equalizer operate to output signals, respectively.

7. The signal processing device of claim 1, wherein the decoding completion time of the basic signaling data of the first frame data is after an input completion time of the first subframe data of the first frame data input into the synchronizer and before an input completion time of second subframe data of the first frame data.

8. The signal processing device of claim 1, wherein the decoded basic signaling data of the first frame data includes number information of preambles of a first frame and reduced carrier mode information of a first subframe.

9. The signal processing device of claim 1, wherein the decoder decodes detail signaling data of the first frame data after completing the decoding of the basic signaling data of the first frame data.

10. The signal processing device of claim 9, wherein a decoding completion time of the detail signaling data of the first frame data is after an input completion time of third subframe data of the first frame data input into the synchronizer and before an input completion time of fourth subframe data of the first frame data.

11. The signal processing device of claim 9, wherein a decoding completion time of the detail signaling data of the first frame data is before an output completion time of second subframe data of the first frame data output by the synchronizer.

12. The signal processing device of claim 2, wherein the synchronizer outputs maximum carrier number information to the equalizer.

13. The signal processing device of claim 12, wherein the equalizer operates from a time delayed further than a start time of the maximum carrier number information of received carriers by an offset period after decoding the basic signaling data of the first frame data.

14. The signal processing device of claim 13, wherein the offset period is set based on Fourier transform output and guard band removal in the synchronizer.

15. An image display apparatus comprising:
    a display; and
    a signal processing device for demodulating a radio frequency (RF) signal received through a channel and processing a demodulated baseband signal,
    wherein the signal processing device comprises:
        a synchronizer configured to decode bootstrap data of first frame data in the received baseband signal; and
        an error corrector including a decoder configured to decode basic signaling data of the first frame data,
    wherein processing payload data of the first frame data is started within a first frame data period or a reception period of the first frame data,
    wherein a decoding completion time of the basic signaling data of the first frame data is after an output completion time of first preamble data of the first frame data output by the synchronizer, and before an output completion time of second preamble data of the first frame data output by the synchronizer or before an output completion time of first subframe data of the first frame data output by the synchronizer.

16. The image display apparatus of claim 15, further comprising:
    a tuner configured to receive the RF signal and convert the RF signal into the baseband signal.

17. The image display apparatus of claim 15, further comprising:
    a tuner configured to receive the RF signal and convert the RF signal into an intermediate frequency signal; and
    a demodulator configured to convert the intermediate frequency signal into the baseband signal.

* * * * *